US010761244B2

(12) United States Patent
Bakin et al.

(10) Patent No.: US 10,761,244 B2
(45) Date of Patent: Sep. 1, 2020

(54) ILLUMINATION ASSEMBLY FOR 3D DATA ACQUISITION

(71) Applicant: ams Sensors Singapore Pte. Ltd., Singapore (SG)

(72) Inventors: Dmitry Bakin, San Jose, CA (US); Markus Rossi, Jona (CH); Kai Engelhardt, Buckenhof (DE)

(73) Assignee: ams Sensors Singapore Pte. Ltd., Singapore (SG)

( * ) Notice: Subject to any disclaimer, the term of this patent is extended or adjusted under 35 U.S.C. 154(b) by 156 days.

(21) Appl. No.: 15/752,336

(22) PCT Filed: Aug. 12, 2016

(86) PCT No.: PCT/SG2016/050388
§ 371 (c)(1),
(2) Date: Feb. 13, 2018

(87) PCT Pub. No.: WO2017/026945
PCT Pub. Date: Feb. 16, 2017

(65) Prior Publication Data
US 2019/0265393 A1 Aug. 29, 2019

Related U.S. Application Data

(60) Provisional application No. 62/215,243, filed on Sep. 8, 2015, provisional application No. 62/210,584, filed
(Continued)

(51) Int. Cl.
*G02B 3/04* (2006.01)
*G02B 13/00* (2006.01)
(Continued)

(52) U.S. Cl.
CPC ............ *G02B 3/04* (2013.01); *G02B 13/003* (2013.01); *G02B 13/18* (2013.01); *G02B 13/008* (2013.01); *G02B 13/16* (2013.01)

(58) Field of Classification Search
CPC ...... G02B 13/16; G02B 13/18; G02B 13/143; G02B 13/14; G02B 9/04; G02B 9/10; G02B 9/06
See application file for complete search history.

(56) References Cited

U.S. PATENT DOCUMENTS 4,603,950 A * 8/1986 Uehara .................... G02B 9/34
359/650
5,969,803 A * 10/1999 Mercado ............. G03F 7/70241
355/67
(Continued)

FOREIGN PATENT DOCUMENTS

| CN | 103257431 A | 8/2013 |
|---|---|---|
| JP | 4123771 B2 | 7/2008 |
| JP | 2014149431 A | 8/2014 |

OTHER PUBLICATIONS

Joseph Geary, "Introduction to Lens Design", 2002, Willmann-Bell, Inc., p. 23 (Year: 2002).*
(Continued)

*Primary Examiner* — Christopher Stanford
(74) *Attorney, Agent, or Firm* — Michael Best and Friedrich LLP

(57) ABSTRACT

This disclosure describes illumination assemblies operable to generate a patterned illumination that maintain high contrast over a wide temperature range. An implementation of the illumination assembly can include an array of monochromatic light sources positioned on an illumination plane, first and second optical elements, and an exit aperture. A chief ray of each light source within the array of monochromatic light sources can substantially converge at an exit aperture. In such implementations light generated by the array of monochromatic light sources can be used efficiently.

18 Claims, 10 Drawing Sheets

Related U.S. Application Data on Aug. 27, 2015, provisional application No. 62/204,839, filed on Aug. 13, 2015.

(51) Int. Cl.
*G02B 13/18* (2006.01)
*G02B 13/16* (2006.01)

(56) References Cited

U.S. PATENT DOCUMENTS

| | | | |
|---|---|---|---|
| 7,301,707 B2* | 11/2007 | Shafer | G02B 13/143 359/649 |
| 8,369,031 B2 | 2/2013 | Tsai | |
| 8,379,321 B2 | 2/2013 | Szapiel et al. | |
| 2003/0206282 A1* | 11/2003 | Omura | G02B 13/143 355/67 |
| 2007/0091470 A1 | 4/2007 | Saito | |
| 2007/0258152 A1* | 11/2007 | Rostalski | G02B 13/143 359/715 |
| 2007/0268594 A1* | 11/2007 | Dodoc | G02B 13/143 359/649 |
| 2007/0273957 A1* | 11/2007 | Zalevsky | G02B 27/0927 359/326 |
| 2009/0323202 A1* | 12/2009 | Chen | G02B 17/08 359/717 |
| 2010/0283978 A1* | 11/2010 | Hawryluk | G03F 7/7005 355/18 |
| 2011/0037953 A1 | 2/2011 | Nizani et al. | |
| 2011/0069216 A1* | 3/2011 | Lee | G02B 13/0035 348/340 |
| 2013/0044187 A1 | 2/2013 | Hammes et al. | |
| 2014/0071404 A1 | 3/2014 | Davidson | |
| 2014/0168780 A1 | 6/2014 | Lee et al. | |
| 2015/0116843 A1* | 4/2015 | Jo | G02B 13/0045 359/713 |
| 2015/0370039 A1* | 12/2015 | Bone | G02B 13/004 359/715 |
| 2016/0161710 A1* | 6/2016 | Liao | G02B 13/002 348/360 |
| 2016/0161711 A1* | 6/2016 | Liao | G02B 13/0035 348/360 |
| 2016/0349414 A1 | 12/2016 | Rudmann et al. | |
| 2017/0108699 A1 | 4/2017 | Perez Calero et al. | |
| 2017/0139178 A1 | 5/2017 | Rossi et al. | |
| 2017/0322424 A1 | 11/2017 | Rossi | |

OTHER PUBLICATIONS

ISA/AU, International Search Report for PCT/SG2016/050388 (dated Oct. 25, 2016).

Taiwanese Intellectual Property Office Action and Search Report for Application No. 105125836 dated Nov. 22, 2019 (7 pages including English translation).

* cited by examiner

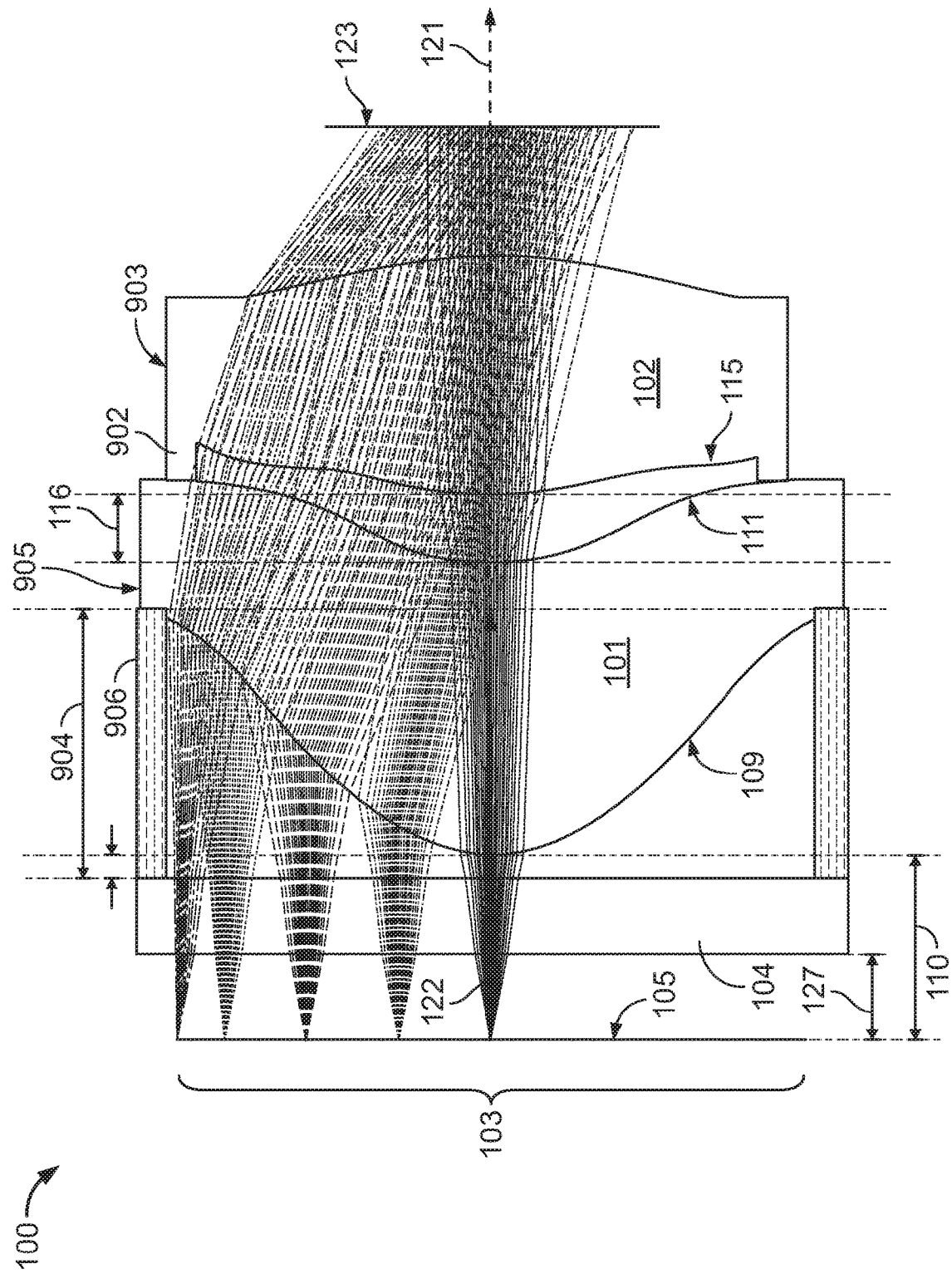

ILLUMINATION ASSEMBLY FOR 3D DATA ACQUISITION

CROSS-REFERENCE TO RELATED APPLICATION(S)

This application is the National Stage of International Application No. PCT/SG2016/050388, filed on Aug. 12, 2016, which claims the benefit of priority U.S. Application No. 62/215,243, filed on Sep. 8, 2015, U.S. Application No. 62/210,584, filed on Aug. 27, 2015, and U.S. Application No. 62/204,839, filed on Aug. 13, 2015. The disclosures of the prior applications are incorporated herein by reference.

TECHNICAL FIELD

This disclosure relates to illumination assemblies that project light for the acquisition of three-dimensional data.

BACKGROUND

Optoelectronic modules can be configured to acquire 3D data of a scene using stereo-, structured light-, or other three-dimensional (3D) imaging technologies. These modules can include an illumination assembly for illuminating a scene with features (e.g., discrete features), features such as projected patterns or textures. The acquisition of accurate, precise 3D data depends, in part, on the proficiency of the illumination assembly to generate features with various characteristics. For example, the illumination assembly should generate features with high-intensity and high contrast. Moreover, the illumination assembly should generate features with customizable illumination characteristics over its full field-of-view (FOY); for example, in some cases features should be generated with homogenous intensity over its full FOV. Furthermore, the illumination assembly should generate features with consistent optical quality over a range of operating temperatures.

An illumination assembly configured to illuminate scenes with high-intensity, high-contrast features includes an optical assembly and an illumination source. Light originating from the illumination source is typically characterized by a numerical aperture; that is, light is emitted within an emission angle (i.e., opening angle) with respect to an emission axis. When an optical assembly is paired with an illumination source having a large numerical aperture, the optical assembly is often configured with an aperture stop to define a certain amount of vignetting in order to mitigate optical aberrations.

For example, an optical assembly can be configured with a single aperture stop, which in turn can result in a small exit pupil (i.e., an aperture stop with a small diameter). Single aperture stops/small exit pupils effectively mitigate detrimental effects (e.g., vignetting) by blocking stray light propagating through the optical assembly, stray light that would otherwise reduce the optical quality of the features. However, since an aperture stop also blocks some of light generated by a light source, the optical assembly configured with an aperture stop is inherently inefficient; that is, some light generated by the light source is not used to illuminate the scene. On the other hand, the design of optical assemblies configured to generate features suitable for the acquisition of 3D data that do not require the use of aperture stops is non-trivial. Such optical assemblies are particularly demanding to simulate, analyze and test.

Moreover, as the optical assembly includes one or more optical elements within the optical assembly, one or more of these optical elements can be susceptible to thermally induced optical instabilities (e.g., changes in refractive index). This is a particular concern for optical elements composed of plastics, where thermal instabilities can cause changes in both the physical dimensions and refractive index of the optical elements. Both of these concerns can be exacerbated by the choice of illumination source. For example, an optical assembly can include a laser/laser array, such as edge-emitting lasers or vertical-cavity surface-emitting lasers (VCSELs) as the illumination source. In some optical assemblies, lasers can effectively produce high-intensity, high-contrast features; however, the high output power of lasers can lead to thermally induced optical instabilities as described above.

SUMMARY

This disclosure describes various examples of implementations of an illumination assembly including an optical assembly and an illumination source operable to generate features suitable for 3D data acquisition. The illumination assembly is implemented with a laser-based illumination source and is particularly efficient in that substantially all light generated from the light sources converges at an exit aperture without the need for aperture stops. In other words, a maximum amount of light illuminates the scene while producing high-intensity, high-contrast features. Further, the disclosed examples of the implementations of the illumination assembly produce high-contrast patterned illuminations over a wide field-of-view and a wide range of operating temperatures.

In some implementations an illumination assembly can be operable to generate a patterned illumination that maintains high contrast over a wide field-of-view and temperature range. The illumination assembly can include an array of monochromatic light sources (such as an array of VCSELs or an illuminated mask) positioned on an illumination plane. Each of the monochromatic light sources are characterized by a numerical aperture and a chief ray, and the illumination plane is of a first diameter. The illumination assembly further includes a first optical element having a first aspheric optical surface separated from the array of monochromatic light sources by a first separation and the first optical element having a second aspheric optical surface juxtaposed from the first aspheric optical surface by a first thickness. The first aspheric optical surface can be a convex object-side surface characterized by a second diameter and the second aspheric optical surface can be a concave image-side surface characterized by a third diameter. The illumination assembly further includes a second optical element having a third aspheric optical surface separated from the second aspheric optical surface by a second separation and the second optical element having a fourth aspheric optical surface juxtaposed from the third aspheric optical surface by a second thickness. The third aspheric optical surface can be a convex object-side surface characterized by a fourth diameter and the fourth aspheric optical surface can be a convex image-side surface characterized by a fifth diameter. Further, the array of monochromatic light sources, and the first and second optical elements can define an optical axis that is substantially parallel to the chief ray of each light source. Further, the array of monochromatic light sources, and the first and second optical elements can define an on-axis focal length, an aspect ratio having a value of at least 0.77, and an exit aperture where the chief ray of each light source substantially converges. The exit aperture can be characterized by a sixth diameter, and can be separated from the fourth aspheric optical surface by a third separation.

In other implementations, the example above can further include a focal-length correction layer. The focal-length correction layer can have a first focal-length correction layer surface separated from the array of monochromatic light sources by a fourth separation. The focal-length correction layer can have a second focal-length correction layer surface juxtaposed from the first focal-length correction layer surface by a third thickness. The first focal-length correction layer surface can be a planar object-side surface and the second focal-length correction layer surface can be a planar image-side surface. Both surfaces can be parallel, substantially orthogonal to the optical axis, and characterized by a seventh diameter.

In other implementations the illumination assembly can include a different set of optical elements, separations, thicknesses, diameters, on-axis focal lengths, aspect ratios, and/or optical element materials and can still be operable to generate a patterned illumination over a wide field-of-view that maintains high contrast over a wide temperature range. For example, the illumination assembly can include an array of monochromatic light sources positioned on an illumination plane. Each monochromatic light source can be characterized by a numerical aperture and a chief ray and the illumination plane can be characterized by a first diameter. The illumination assembly can further include a first optical element having a first aspheric optical surface separated from the array of monochromatic light sources by a first separation and the first optical element having a second aspheric optical surface juxtaposed from the first aspheric optical surface by a first thickness. The first aspheric optical surface can be a center-concave/convex object-side surface characterized by a second diameter and the second aspheric optical surface can be a convex image-side surface characterized by a third diameter. The illumination assembly can further include a second optical element having a third aspheric optical surface separated from the second aspheric optical surface by a second separation and the second optical element having a fourth aspheric optical surface juxtaposed from the third aspheric optical surface by a second thickness. The third aspheric optical surface can be a convex object-side surface characterized by a fourth diameter and the fourth aspheric optical surface can be a concave image-side surface characterized by a fifth diameter; and a third optical element having a spheric optical surface separated from the fourth aspheric optical surface by a third separation and the third optical element having a planar optical surface juxtaposed from the spheric optical surface by a third thickness. The spheric optical surface can be a convex object-side surface characterized by a sixth diameter and the planar optical surface can be characterized by the sixth diameter. The array of monochromatic light sources, first, second, and third optical elements can define an optical axis substantially parallel to the chief ray of each light source, an on-axis focal length, an aspect ratio can have a value of at least 0.68, and an exit aperture wherein the chief ray of each light source substantially converges. The exit aperture is characterized by a seventh diameter and can be separated from the planar optical surface by a fourth separation.

In other implementations, the example above can further include a focal-length correction layer. The focal-length correction layer can have a first focal-length correction layer surface separated from the array of monochromatic light sources by a fifth separation and a second focal-length correction layer surface juxtaposed from the first focal-length correction layer surface by a fourth thickness. The first focal-length correction layer surface can be a planar object-side surface and the second focal-length correction layer surface can be a planar image-side surface. Both surfaces can be parallel, substantially orthogonal to the optical axis, and characterized by an eighth diameter.

Still in other implementations the illumination assembly can include a different set of optical elements, separations, thicknesses, diameters, on-axis focal lengths, aspect ratios, and/or optical element materials and can still be operable to generate a patterned illumination over a wide field-of-view that maintains high contrast over a wide temperature range. For example, the illumination assembly can include an array of monochromatic light sources positioned on an illumination plane. Each monochromatic light source can be characterized by a numerical aperture and a chief ray and the illumination plane can be characterized by a first diameter. The illumination assembly can further include a first optical element having a first aspheric optical surface separated from the array of monochromatic light sources by a first separation and the first optical element having a second aspheric optical surface juxtaposed from the first aspheric optical surface by a first thickness. The first aspheric optical surface can be a convex object-side surface characterized by a second diameter and the second aspheric optical surface can be a convex image-side surface characterized by a third diameter. The illumination assembly can further include a second optical element having a third aspheric optical surface separated from the second aspheric optical surface by a second separation and the second optical element having a fourth aspheric optical surface juxtaposed from the third aspheric optical surface by a second thickness. The third aspheric optical surface can be a convex object-side surface characterized by a fourth diameter and the fourth aspheric optical surface can be a concave image-side surface characterized by a fifth diameter. The illumination assembly can further include a third optical element having a fifth aspheric optical surface separated from the fourth aspheric optical surface by a third separation and the third optical element having a sixth aspheric optical surface juxtaposed from the fifth aspheric optical surface by a third thickness. The fifth aspheric optical surface can be a convex object-side surface characterized by a sixth diameter and the sixth aspheric optical surface can be a convex image-side surface characterized by a seventh diameter; wherein the array of monochromatic light sources, first, second, and third optical elements can define an optical axis substantially parallel to the chief ray of each light source, an on-axis focal length, an aspect ratio can have a value of at least 0.809, and an exit aperture where the chief ray of each light source can substantially converge. The exit aperture is characterized by an eighth diameter and can be separated from the sixth aspheric optical surface by a fourth separation.

In other implementations, the examples above can further include a focal-length correction layer. The focal-length correction layer can have a first focal-length correction layer surface separated from the array of monochromatic light sources by a fifth separation and a second focal-length correction layer surface juxtaposed from the first focal-length correction layer surface by a fourth thickness. The first focal-length correction layer surface can be a planar object-side surface and the second focal-length correction layer surface can be a planar image-side surface. Both surfaces can be parallel, substantially orthogonal to the optical axis, and characterized by a ninth diameter.

Still in other implementations, the examples above and other implementations can include a thermal compensation spacer.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural changes may be made without departing from the scope of the present invention. The following description of example embodiments is, therefore, not to be taken in a limited sense, and the scope of the present invention is defined by the appended claims.

BRIEF DESCRIPTION OF THE DRAWINGS

FIG. 9A depicts an example illumination assembly as depicted in FIG. 1 with the addition of a thermal compensation spacer.

DETAILED DESCRIPTION

Figure 1:
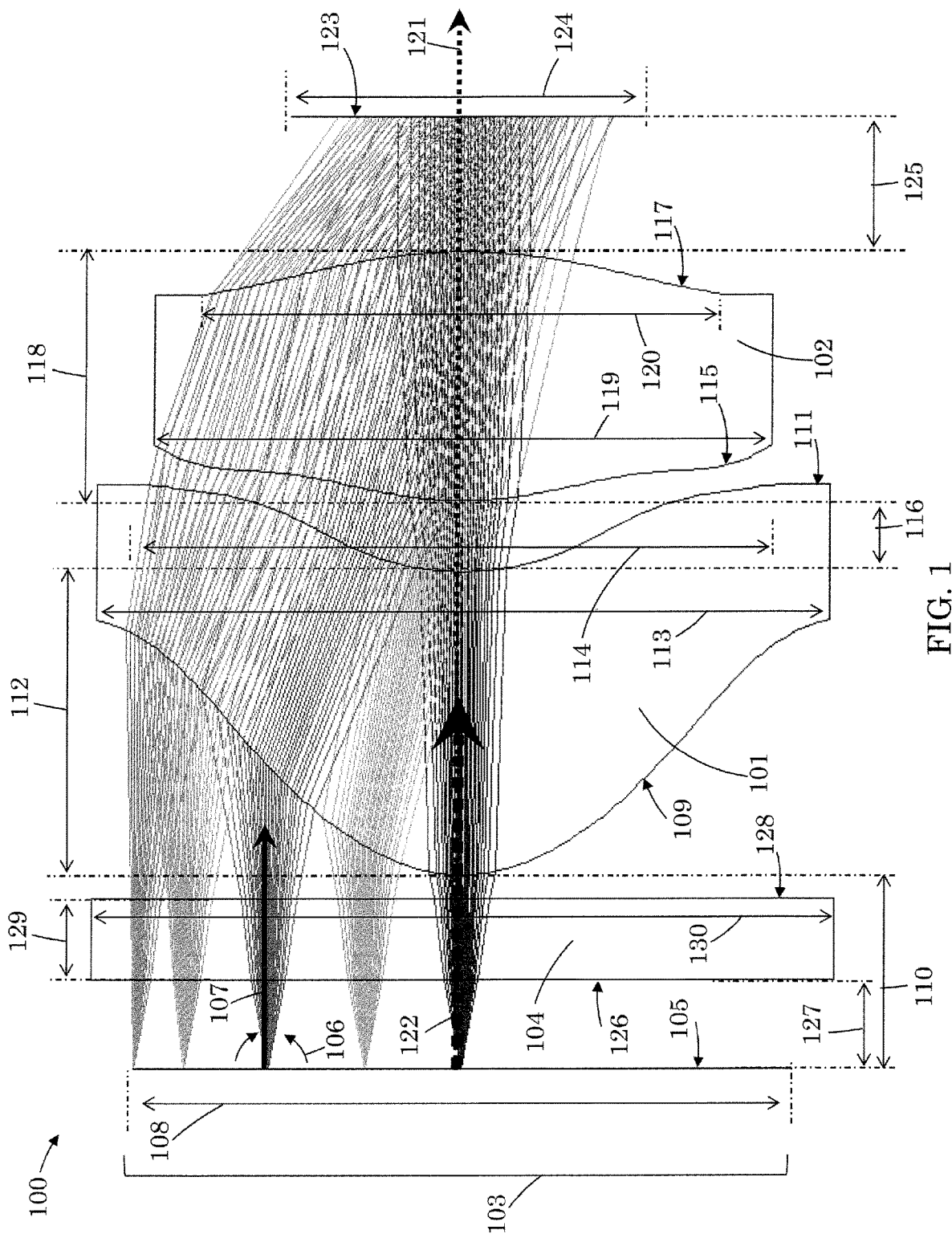
FIG. 1 depicts an example illumination assembly implemented with two optical elements, a focal-length correction layer, and an illumination source.

FIG. 1 depicts an example illumination assembly 100 operable to generate a patterned illumination with high-contrast features at 300 mm with a diameter of 540.3 mm that can maintain high contrast over a wide large operating-temperature range. In other implementations, however, the illumination assembly 100 can be operable to generate a patterned illumination with high-contrast features at different distances (e.g., from 100 mm to 1000 mm). Further, the illumination assembly 100 can be operable to generate a patterned illumination with high contrast features over a large range of distances (e.g., from 100 mm to 1000 mm). The example illumination assembly 100 can be modeled or simulated by, for example, sequential and/or non-sequential ray-tracing simulation software such as Zemax. Starting from the object-side and progressing to the image side of the illumination assembly 100, the illumination assembly 100 includes first and second optical elements 101, 102, respectively. The first optical element 101 can be composed of an optical polymer such as OKP-1 (i.e., having the properties of OKP-1 optical polymer). However any suitable optical polymer can be substituted; for example, any optical polymer with a similarly low birefringence, with thermodynamic transition temperatures (e.g., melting temperatures, other transition temperatures) that are well above the intended operating temperature (e.g., above 80° C.), high optical transmission, with similar refractive indices, and optical polymers with similar thermal behavior with respect to refractive index and dimensional stability can be substituted. The second optical element 102 can be composed of an optical glass such as M-BACD12 (i.e., having the properties of M-BACD12 optical glass). However any suitable optical glass can be substituted; for example, any optical glass with a similarly low birefringence, with thermodynamic transition temperatures (e.g., melting temperatures, other transition temperatures) that are well above the intended operating temperature (e.g., above 80° C.), high optical transmission, with similar refractive indices, and optical glasses with similar thermal behavior with respect to refractive index and dimensional stability can be substituted. The illumination assembly 100 further includes an array of monochromatic light sources 103 located at the object position (of the simulation depicted in FIG. 1). The array of monochromatic light sources can be an array of monochromatic vertical-cavity surface-emitting lasers. In other implementations, however, an illuminated mask (the mask including portions defining throughholes that permit transmission of light) can be operable as the array of monochromatic light sources. Further, the array of monochromatic light sources can emit light of a particular wavelength, or narrow range of wavelengths such as infrared radiation. In the example illumination assembly depicted in FIG. 1, the array of monochromatic light sources is operable to emit light of a wavelength of 850 nm; however, in other implementations the array of monochromatic light sources can be operable to emit other wavelengths of light. Further, in the example illumination assembly depicted in FIG. 1 the array of monochromatic light sources are telecentric, e.g., laser beam source, with a normalized Gaussian profile and angular intensity distribution according to the following: I=exp(-2*angle/arcsine (N.A.)). In this example, N.A. (i.e., numerical aperture of the light source) is 0.19. However, in other example, the numerical aperture of the monochromatic light source can be larger or smaller depending on the intended application. For example, in some implementations the numerical aperture of the monochromatic light source can be as much as 0.3, while in other implementations the numerical aperture can be 0.1. Still in other implementations numerical apertures of the monochromatic light source can be between 0.1 and 0.3.

In this example, the illumination assembly 100 further includes a focal-length correction layer 104; however, the focal-length correction layer can be omitted in other implementations (where manufacturing, or other tolerances permit). The focal-length correction layer can be composed of an optical glass such as D263 T (i.e., having the properties of Schott D 263 T). However any suitable optical glass can be substituted; for example, any optical glass with a similarly low birefringence, with thermodynamic transition temperatures (e.g., melting temperatures, other transition temperatures) that are well above the intended operating temperature (e.g., above 80° C.), high optical transmission, with similar refractive indices, and optical glasses with similar thermal behavior with respect to refractive index and dimensional stability can be substituted. Further the focal-length correction layer can include a layer or layers of removable material of suitable optical quality such as a radiation-sensitive photoresist. In some cases, portions of the radiation-sensitive photoresist can be removed to correct the focal-length of the illumination assembly 100, further details are discussed below.

The array of monochromatic light sources 103 are positioned on an illumination plane 105. Each monochromatic light source can be characterized by a numerical aperture 106. In some implementations, the numerical aperture can range from 0.1-0.3. Each monochromatic light source can be further characterized by a chief ray 107 (i.e., the principal ray emanating from each monochromatic light source). In the implementation depicted in FIG. 1, the chief rays 107 of each monochromatic light source are substantially orthogonal to the illumination plane 105. Further, the monochromatic light sources are distributed over a diameter 108 (the first diameter of the illumination assembly 100) of the illumination plane 105.

In this implementation, the first optical element 101 includes first and second aspheric optical surfaces 109, 111, respectively. The first aspheric optical surface 109 is positioned on the object side of the optical element 101, while the second aspheric optical surface 111 is positioned on the image-side of the optical element 101. The aspheric optical surface 109 is separated from the array of monochromatic light sources 103 by a first separation 110 relative to the vertex of the optical surface. The first and second aspheric optical surfaces 109, 111 are separated from each other by a first thickness 112 relative to the vertices of the respective optical surfaces (i.e. the thickness of the first optical element 101. Further, in this implementation, the first aspheric optical surface 109 is a convex object-side surface characterized by a diameter 113 (the second diameter in the illumination assembly 100). The second aspheric optical surface 111, in this implementation, is a concave image-side surface characterized by a diameter 114 (the third diameter in the illumination assembly 100).

The second optical element 102 includes two aspheric optical surfaces 115, 117, respectively (the third 115 and fourth 117 aspheric optical surface in the illumination assembly 100). The third aspheric optical surface 115 is separated from the second aspheric optical surface 111 by a separation 116 relative to the vertices of the respective optical surfaces (the second separation 116 in the illumination assembly 100). The fourth aspheric optical surface 117 is separated from the third aspheric optical surface by a thickness 118 relative to the vertices of the respective optical surfaces (the second thickness 118 in the illumination assembly 100). The third aspheric optical surface 115 is a convex object-side surface, in this implementation, characterized by a diameter 119 (the fourth diameter 119 in the illumination assembly 100). Further, the fourth aspheric optical surface 117 is a convex image-side surface characterized by a diameter 120 (the fifth diameter 120 in the illumination assembly 100).

The array of monochromatic light sources, the first optical element 101, and the and second optical element 102 define an optical axis 121. The optical axis 121 is substantially parallel to the chief ray 107 of each light source in the array of monochromatic light sources 103 in this implementation. Further, the array of monochromatic light sources, the first optical element 101, and the second optical element 102 define an on-axis focal length 122 (representatively depicted as a dotted arrow in FIG. 1), an aspect ratio can have a value of at least 0.77 (i.e., the largest diameter from among diameters of the optical element surfaces of the illumination assembly 100/total track length, where the total track length is defined as the sum of the first separation, first thickness, second separation and second thickness), and an exit aperture 123. Further, the chief ray 107 of each light source in the array of monochromatic light sources 103 substantially converges at the exit aperture 123 obviating the need for a physical aperture stop. Accordingly, as substantially all of the light emitted by the array of monochromatic light sources converges at the exit aperture 123 the illumination assembly is particularly efficient. The exit aperture 123 is further characterized by a diameter 124 (a sixth diameter 124 in the illumination assembly 100) and is separated from the fourth aspheric optical surface by a separation 125 relative to the vertex of the optical surface (the third separation 125 in the illumination assembly 100).

The focal-length correction layer 104, described above, can include a first focal-length correction layer surface 126 separated from the array of monochromatic light sources by a separation 127 (the fourth separation 127 in the illumination assembly 100). The focal-length correction layer 104 can have a second focal-length correction layer surface 128 juxtaposed from the first focal-length correction layer surface 126 by a thickness 129 (the third thickness 129 in the illumination assembly 100). The first focal-length correction layer surface 126 is a planar object-side surface and the second focal-length correction layer surface 128 is a planar image-side surface in this implementation. Further, both surfaces 126, 128 can be substantially parallel and substantially orthogonal to the optical axis 121. The surfaces 126, 128 are further characterized by a single diameter 130 (the seventh diameter in the illumination assembly 100) in this implementation. As described above, the surfaces 126, 128 can further include a photo-sensitive photo-resist material.

In the example illumination assembly depicted in FIG. 1, the optical elements 101,102 are implemented as aspheric lenses. That is, the first, second, third and fourth aspheric optical surfaces 109, 111, 115, and 117, respectively are implemented as aspheric surfaces that can be described by the following set of polynomial coefficients and constants as implemented in the typical aspheric surface equation:

$$z(r) = \frac{r^2}{R\left(1 + \sqrt{1-(1+\kappa)\frac{r^2}{R^2}}\right)} + \alpha_1 r^2 + \alpha_2 r^4 + \alpha_3 r^6 + \ldots ,$$

where the optical axis is presumed to lie in the z-direction, and z(r) is the sag, i.e., the z-component of the displacement of the surface from the vertex, at distance r from the axis. The aspheric coefficients $\alpha_i$ describe the deviation of the surface from the axially symmetric quadric surface specified by R and P.

| Coefficient | Surface | | | |
| --- | --- | --- | --- | --- |
| | $1^{st}$ Aspheric | $2^{nd}$ Aspheric | $3^{rd}$ Aspheric | $4^{th}$ Aspheric |
| Fourth-order | −1.4515988 | 2.9311581 | −0.014622077 | −0.38476141 |
| Sixth-order | 4.9973393 | −18.604352 | −4.4969585 | 1.4390075 |
| Eighth-order | −12.076277 | 38.366598 | 11.179861 | −1.299957 |
| Tenth-order | 11.414254 | −34.810955 | −7.2744705 | 0 |
| Twelfth-order | −4.1162853 | 11.668445 | 0 | 0 |

The first, second, third and fourth aspheric optical surfaces 109, 111, 115, and 117, respectively, are further described by the radiuses of curvature 0.405, 0.800, 0.969, −1.394, respectively, and the conic constants (K) −0.85, −1, −4.39, and −12.

In the example implementation depicted in FIG. 1, the on-axis focal length 122 can be 0.89 mm, for example, relative to the illumination plane. Accordingly, the first separation 110 can be 0.503 mm, the second separation 116 can be 0.185 mm, the third separation 125 can be 0.35 mm, the fourth separation 127 can be 0.233 mm, the first thickness 112 can be 0.787 mm, the second thickness 118 can be 0.645 mm, the third thickness 129 can be 0.21 mm, the first diameter 108 can be 1.7 mm, the second diameter 113 can be 1.9 mm, the third diameter 114 can be 1.68 mm, the fourth diameter 119 can be 1.6 mm, the fifth diameter 120 can be 1.28 mm, the sixth diameter 124 can be 0.9 mm, and the seventh diameter 130 can be 1.923 mm.

However, different on-axis focal lengths can be used in other implementations of the example illumination assembly 100 depicted in FIG. 1. Accordingly, the separations, thicknesses, and diameters of the implementation depicted in FIG. 1 can also be described as ratios of the on-axis focal length. Consequently, the ratio of the first diameter 108 to the on axis focal length 122 can be 1.91:1, the ratio of the second diameter 113 to the on-axis focal length 122 can be 2.13:1, the ratio of the third diameter 114 to the on-axis focal length 122 can be 1.89:1, the ratio of the fourth diameter 119 to the on-axis focal length 122 can be 1.80:1, the ratio of the fifth diameter 120 to the on-axis focal length 122 can be 1.44:1, the ratio of the sixth diameter 124 to the on-axis focal length 122 can be 1.01:1, the ratio of the seventh diameter 130 to the on-axis focal length 122 can be 2.16:1, the ratio of the first separation 110 to the on-axis focal length 122 can be 0.57:1, the ratio of the second separation 116 to the on-axis focal length 122 can be 0.21:1, the ratio of the third separation 125 to the on-axis focal length 122 can be 0.39:1, the ratio of the fourth separation 127 to the on-axis focal length 122 can be 0.26:1, the ratio of the first thickness 112 to the on-axis focal length 122 can be 0.88:1, the ratio of the second thickness 118 to the on-axis focal length 122 can be 0.73:1, the ratio of the third thickness 129 to the on-axis focal length 122 can be 0.24:1. Moreover, a diameter of the illumination plane 105 (the first diameter 108 of the illumination assembly 100) can have different values from the one depicted in FIG. 1. Accordingly, the exit aperture separation (the third separation 125) and the exit aperture diameter (the sixth diameter 124) can also be described as ratios of the illumination plane diameter (the first diameter 108). Consequently, the ratio of the third separation 125 to the first diameter 108 can be 0.21:1, and the ratio of the sixth diameter 124 to the first diameter 108 can be 0.53:1. Since the example illumination assembly 100 described above can be modeled or simulated by, for example, sequential and/or non-sequential ray-tracing simulation software such as Zemax, the numerals included above describe the various components (e.g., thicknesses, diameters, surface shapes) and their position within the illumination assembly 100, these numerals include a plurality of decimal places. For example the aspheric coefficients used to describe the aspheric surfaces of various components above can include as many as nine decimals places. However, although up to nine decimals places are included above, in some cases far fewer decimal places are needed to adequately describe the various components and their respective position within the illumination assembly 100. For example, in some cases no more than two decimal places are required in order to effectively describe various components and their respective position described above.

Figure 2:
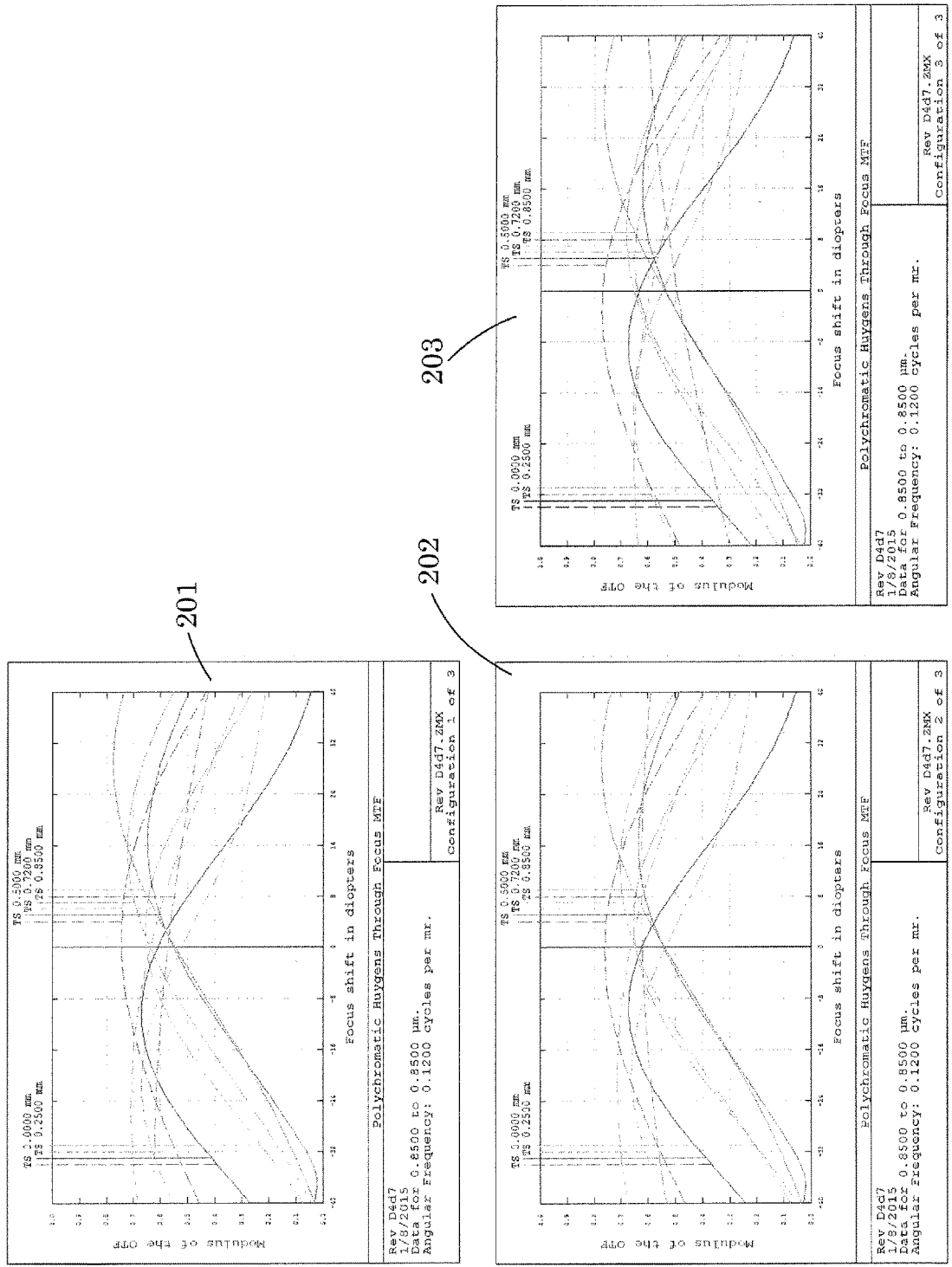
FIG. 2 depicts MTF curves of the example implementation depicted in FIG. 1.

FIG. 2 depicts mean transfer function data (MTF curves) of the example implementation depicted in FIG. 1. The MTF curves illustrate the high contrast of the patterned illumination generated by the illumination assembly 100 over a wide operating-temperature range; specifically, 20° C. 201, 45° C. 202, and 70° C. 203.

Figure 3:
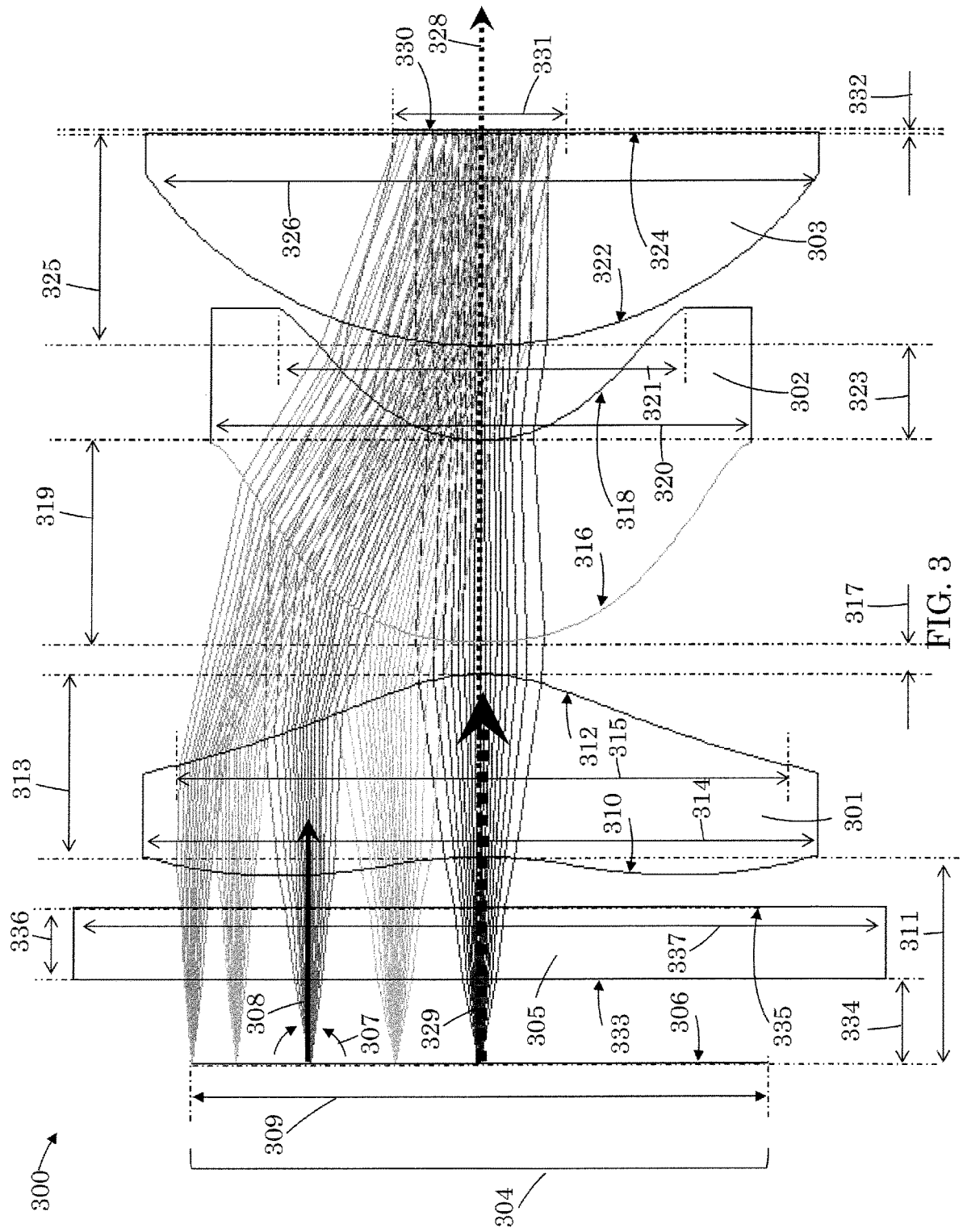
FIG. 3 depicts an example illumination assembly implemented with three optical elements, a focal-length correction layer, and an illumination source.

FIG. 3 depicts an example illumination assembly 300 operable to generate a patterned illumination with high-contrast features at 300 mm with a diameter of 809.642 mm that can maintain high contrast over a wide operating-temperature range. In other implementations, however, the illumination assembly 300 can be operable to generate a patterned illumination with high-contrast featured at different distances (e.g., from 100 mm to 1000 mm) Further, the illumination assembly 300 can be operable to generate a patterned illumination with high contrast features over a large range of distances (e.g., from 100 mm to 1000 mm) The example illumination assembly 300 can be modeled or simulated by, for example, sequential and/or non-sequential ray-tracing simulation software such as Zemax. Starting from the object-side and progressing to the image side of the illumination assembly 300, the illumination assembly 300 includes first, second, and third optical elements 301, 302, 303 respectively. The first optical element and second optical elements 301, 302 can be composed of an optical polymer such as OKP-1 (i.e., having the properties of OKP-1 optical polymer). However any suitable optical polymer can be substituted; for example, any optical polymer with a similarly low birefringence, with thermodynamic transition temperatures (e.g., melting temperatures, other transition temperatures) that are well above the intended operating temperature (e.g., above 80° C.), high optical transmission, with similar refractive indices, and optical polymers with similar thermal behavior with respect to refractive index and dimensional stability can be substituted. The third optical element 303 can be composed of an optical polymer such as TAFD37 (i.e., having the properties of TAFD37 optical polymer). However any suitable optical glass can be substituted; for example, any optical glass with a similarly low birefringence, with thermodynamic transition temperatures (e.g., melting temperatures, other transition temperatures) that are well above the intended operating temperature (e.g., above 80° C.), high optical transmission, with similar refractive indices, and optical glasses with similar thermal behavior with respect to refractive index and dimensional stability can be substituted. The illumination assembly 300 further includes an array of monochromatic light sources 304 located at the object position (of the simulation depicted in FIG. 3). The array of monochromatic light sources can be an array of monochromatic vertical-cavity surface-emitting lasers. In other implementations, however, an illuminated mask (the mask including portions defining throughholes that permit transmission of light) can be operable as the array of monochromatic light sources. Further, the array of monochromatic light sources can emit light of a particular wavelength, or narrow range of wavelengths such as infrared radiation. In the example illumination assembly depicted in FIG. 3, the array of monochromatic light sources is operable to emit light of a wavelength of 850 nm; however, in other implementations the array of monochromatic light sources can be operable to emit other wavelengths of light. Further, in the example illumination assembly depicted in FIG. 3 the array of monochromatic light sources are telecentric, e.g., laser beam source, with a normalized Gaussian profile and angular intensity distribution according to the following: I=exp(−2*angle/arcsine (N.A.)). In this example, N.A. (i.e., numerical aperture of the light source) is 0.19. However, in other example, the numerical aperture of the monochromatic light source can be larger or smaller depending on the intended application. For example, in some implementations the numerical aperture of the monochromatic light source can be as much as 0.3, while in other implementations the numerical aperture can be 0.1. Still in other implementations numerical apertures of the monochromatic light source can be between 0.1 and 0.3.

In this example, the illumination assembly 300 further includes a focal-length correction layer 305; however, the focal-length correction layer can be omitted in other implementations (where manufacturing, or other tolerances permit). The focal-length correction layer can be composed of an optical glass such as D263T (i.e., having the properties of Schott D 263 T). However any suitable optical glass can be substituted; for example, any optical glass with a similarly low birefringence, with thermodynamic transition temperatures (e.g., melting temperatures, other transition temperatures) that are well above the intended operating temperature (e.g., above 80° C.), high optical transmission, with similar refractive indices, and optical glasses with similar thermal behavior with respect to refractive index and dimensional stability can be substituted. Further the focal-length correction layer can include a layer or layers of removable material of suitable optical quality such as a radiation-sensitive photoresist. In some cases, portions of the radiation-sensitive photoresist can be removed to correct the focal-length of the illumination assembly 300, further details are discussed below.

The array of monochromatic light sources 304 are positioned on an illumination plane 306. Each monochromatic light source can be characterized by a numerical aperture 307. In some implementations, the numerical aperture can range from 0.1-0.3. Each monochromatic light source can be further characterized by a chief ray 308 (i.e., the principal ray emanating from each monochromatic light source). In the implementation depicted in FIG. 3, the chief rays 308 of each monochromatic light source are substantially orthogonal to the illumination plane 306. Further, the monochromatic light sources are distributed over a diameter 309 (the first diameter of the illumination assembly 300) of the illumination plane 306.

In this implementation, the first optical element 301 includes first and second aspheric optical surfaces 310, 312, respectively. The first aspheric optical surface 310 is positioned on the object side of the optical element 301, while the second aspheric optical surface 312 is positioned on the image-side of the optical element 301. The aspheric optical surface 310 is separated from the array of monochromatic light sources 304 by a first separation 311 relative to the vertex of the optical surface. The first and second aspheric optical surfaces 310, 312 are separated from each other by a first thickness 313 relative to the vertices of the respective optical surfaces (i.e. the thickness of the first optical element 301. Further, in this implementation, the first aspheric optical surface 310 is a center-concave/convex object-side surface characterized by a diameter 314 (the second diameter in the illumination assembly 300). The second aspheric optical surface 312, in this implementation, is a convex image-side surface characterized by a diameter 315 (the third diameter in the illumination assembly 300).

The second optical element 302 includes two aspheric optical surfaces 316, 318, respectively (the third 316 and fourth 318 aspheric optical surfaces in the illumination assembly 300). The third aspheric optical surface 316 is separated from the second aspheric optical surface 312 by a separation 317 relative to the vertices of the respective optical surfaces (the second separation 317 in the illumination assembly 300). The fourth aspheric optical surface 318 is separated from the third aspheric optical surface by a thickness 319 relative to the vertices of the respective optical surfaces (the second thickness 319 in the illumination assembly 300). The third aspheric optical surface 316 is a convex object-side surface, in this implementation, characterized by a diameter 320 (the fourth diameter 320 in the illumination assembly 300. Further, the fourth aspheric optical surface 318 is a concave image-side surface characterized by a diameter 321 (the fifth diameter 321 in the illumination assembly 300).

The third optical element 303 includes a spheric optical surface 322. The first spheric optical surface 322 is separated from the fourth aspheric optical surface 318 by a separation 323 relative to the vertices of the respective optical surfaces (the third separation 323 in the illumination assembly 300). The third optical element 303 also includes a planar optical surface 324. The planar optical surface 324 is separated from the first spheric optical surface 322 by a thickness 325 relative to the vertex of the optical surface (the third thickness 325 in the illumination assembly 300). The spheric optical surface 322 is a convex object-side surface, in this implementation, characterized by a diameter 326 (the sixth diameter 326 in the illumination assembly 300. Further, the planar optical surface 324 is substantially planar and characterized by a diameter 326 (the sixth diameter 326 in the illumination assembly 300).

The array of monochromatic light sources 304, the first optical element 301, the second optical element 302, and the third optical element 303 define an optical axis 328. The optical axis 328 is substantially parallel to the chief ray 308 of each light source in the array of monochromatic light sources 304 in this implementation. Further, the array of monochromatic light sources 304, the first optical element 301, the second optical element 302, and the third optical element 303 define an on-axis focal length 329 (representatively depicted as a dotted arrow in FIG. 3), an aspect ratio can have a value of at least 0.68 (i.e., the largest diameter from among diameters of the optical element surfaces of the illumination assembly 300/total track length, where the total track length is defined as the sum of the first separation, first thickness, second separation, second thickness, third separation, and third thickness), and an exit aperture 330. Further, the chief ray 308 of each light source in the array of monochromatic light sources 304 substantially converges at the exit aperture 330 obviating the need for a physical aperture stop. Accordingly, as substantially all of the light emitted by the array of monochromatic light sources converges at the exit aperture 330 the illumination assembly is particularly efficient. The exit aperture 330 is further characterized by a diameter 331 (a seventh diameter 331 in the illumination assembly 300) and is separated from the planar optical surface 324 by a separation 332 (the fourth separation 332 in the illumination assembly 300).

The focal-length correction layer 305, described above, can include a first focal-length correction layer surface 333 separated from the array of monochromatic light sources by a separation 334 (the fifth separation 334 in the illumination assembly 300). The focal-length correction layer 305 can have a focal-length correction layer surface 335 juxtaposed from the first focal-length correction layer surface 333 by a thickness 336 (the fourth thickness 336 in the illumination assembly 300). The first focal-length correction layer surface 333 is a planar object-side surface and the second focal-length correction layer surface 335 is a planar image-side surface in this implementation. Further, both surfaces 333, 335 can be substantially parallel and substantially orthogonal to the optical axis 328. The surfaces 333, 335 are further characterized by a single diameter 337 (the eighth diameter in the illumination assembly 300) in this implementation. As described above, the surfaces 333, 335 can further include a photo-sensitive photo-resist material.

In the example illumination assembly depicted in FIG. 3, the optical elements 301, 302 are implemented as aspheric optical elements. That is, the first, second, third and fourth aspheric optical surfaces 310, 312, 316, and 318, respectively are implemented as aspheric surfaces that can be described by the following set of polynomial coefficients and constants as implemented in the typical aspheric surface equation described above.

| Coefficient | Surface | | | |
| --- | --- | --- | --- | --- |
| | 1$^{st}$ Aspheric | 2$^{nd}$ Aspheric | 3$^{rd}$ Aspheric | 4$^{th}$ Aspheric |
| Fourth-order | −0.46833037 | −0.24158227 | 2.5537212 | −0.47584216 |
| Sixth-order | 2.49633 | 0.79421091 | −5.518433 | 3.3407531 |
| Eighth-order | −3.0956099 | −0.6762776 | 7.4436188 | −9.0333958 |
| Tenth-order | 1.4420473 | 0.2446093 | −4.5013594 | 8.5822095 |
| Twelfth-order | 0 | 0 | 0 | −13.100605 |

The first, second, third and fourth aspheric optical surfaces 310, 312, 316, and 318, respectively, are further described by the radiuses of curvature −2.145643, −0.4959369, 1.852989, 0.4253542, respectively, the conic constants (K) 3.55, −3.45, −10.7, and −0.9, respectively. Further, the spheric optical surface 323 can be characterized by a radius of curvature equal to 1.

In the example implementation depicted in FIG. 3, the on-axis focal length 329 can be 1.00 mm, for example, relative to the illumination plane. Accordingly, the first separation 311 can be 0.537 mm, the second separation 317 can be 0.09 mm, the third separation 323 can be 0.25 mm, the fourth separation 332 can be 0.01 mm, the fifth separation 334 can be 0.18 mm, the first thickness 313 can be 0.59 mm, the second thickness 319 can be 0.58, the third thickness 325 can be 0.82 mm, the fourth thickness 336 can be 0.21 mm, the first diameter 309 can be 1.9 mm, the second diameter 314 can be 1.96 mm, the third diameter 315 can be 1.96 mm, the fourth diameter 320 can be 1.74 mm, the fifth diameter 321 can be 1.36 mm, the sixth diameter 326 can be 1.96 mm, the seventh diameter 331 can be 0.46 mm, and the eighth diameter 337 can be 2.4 mm.

However, different on-axis focal lengths can be used in other implementations of the example illumination assembly 300 depicted in FIG. 3. Accordingly, the separations, thicknesses, and diameters of the implementation depicted in FIG. 3 can also be described as ratios of the on-axis focal length. Consequently, the ratio of the first diameter 309 to the on-axis focal length 329 can be 1.9, the ratio of the second diameter 314 to the on-axis focal length 329 can be 1.96, the ratio of the third diameter 315 to the on-axis focal length 329 can be 1.96, the ratio of the fourth diameter 320 to the on-axis focal length 329 can be 1.74, the ratio of the fifth diameter 321 to the on-axis focal length 329 can be 1.36, the ratio of the sixth diameter 326 to the on-axis focal length 329 can be 1.96, the ratio of the seventh diameter 331 to the on-axis focal length 329 can be 0.46, the ratio of the eighth diameter 337 to the on-axis focal length 329 can be 2.4, the ratio of the first separation 311 to the on-axis focal length 329 can be 0.537, the ratio of the second separation 317 to the on-axis focal length 329 can be 0.09, the ratio of the third separation 323 to the on-axis focal length 329 can be 0.25, the ratio of the fourth separation 332 to the on-axis focal length 329 can be 0.01, the ratio of the fifth separation 334 to the on-axis focal length 329 can be 0.18, the ratio of the first thickness 313 to the on-axis focal length 329 can be 0.59, the ratio of the second thickness 319 to the on-axis focal length 329 can be 0.58, the ratio of the third thickness 325 to the on-axis focal length 329 can be 0.82, the ratio of the fourth thickness 336 to the on-axis focal length 329 can be 0.21. Since the example illumination assembly 300 described above can be modeled or simulated by, for example, sequential and/or non-sequential ray-tracing simulation software such as Zemax, the numerals included above describe the various components (e.g., thicknesses, diameters, surface shapes) and their position within the illumination assembly 300, these numerals include a plurality of decimal places. For example the aspheric coefficients used to describe the aspheric surfaces of various components above can include as many as eight decimals places. However, although up to eight decimals places are included above, in some cases far fewer decimal places are needed to adequately describe the various components and their respective position within the illumination assembly 300. For example, in some cases no more than two decimal places are required in order to effectively describe various components and their respective position described above.

Figure 4:
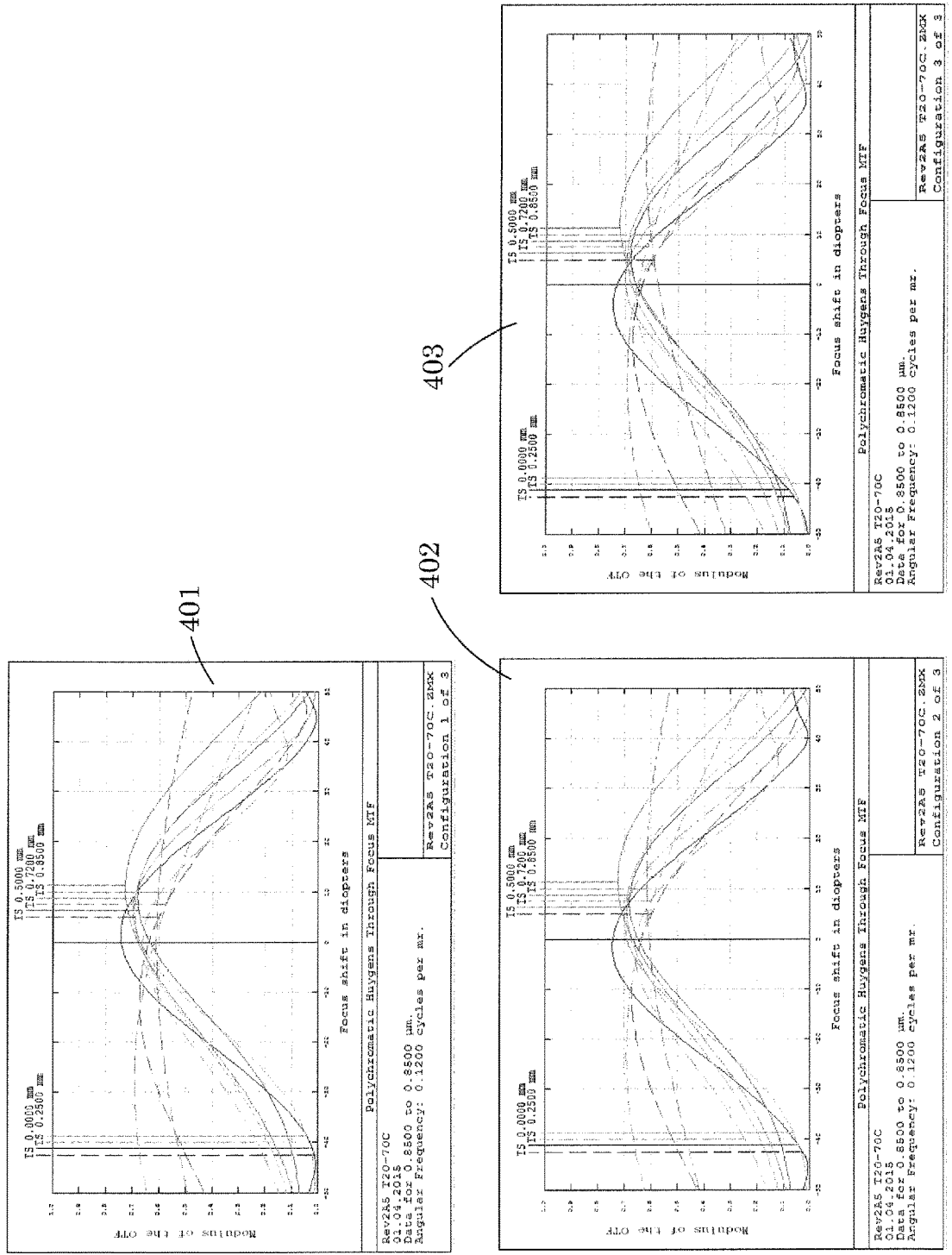
FIG. 4 depicts MTF curves of the example implementation depicted in FIG. 3.

FIG. 4 depicts mean transfer function data (MTF curves) of the example implementation depicted in FIG. 3. The MTF curves illustrate the high contrast of the patterned illumination generated by the illumination assembly 300 over a wide operating-temperature range; specifically, 20° C. 401, 45° C. 402, and 70° C. 403.

Figure 5:
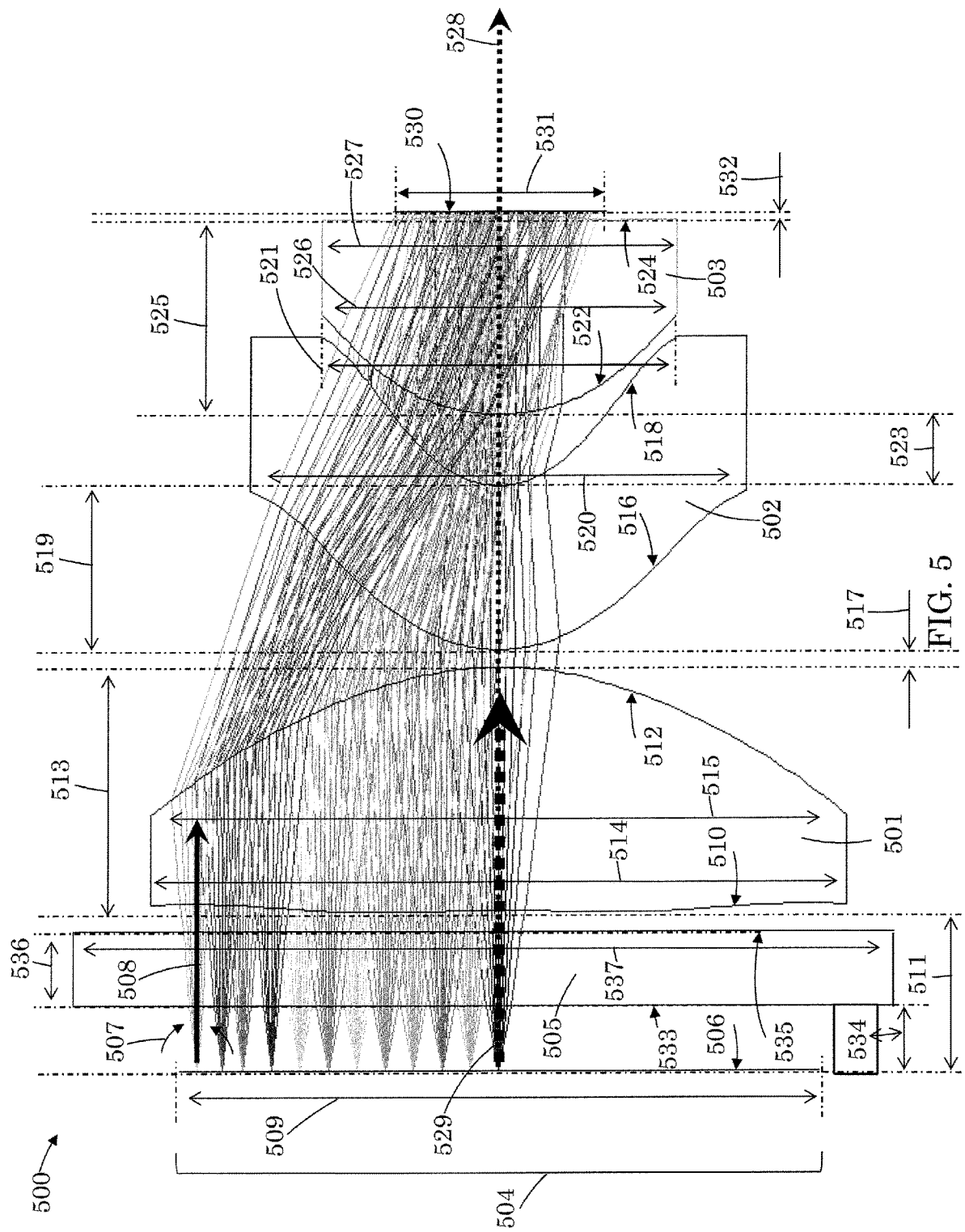
FIG. 5 depicts another example illumination assembly implemented with three optical elements, a focal-length correction layer, and an illumination source.

FIG. 5 depicts an example illumination assembly 500 operable to generate a patterned illumination with high-contrast features at 1000 mm with a diameter of 2322.23 mm that can maintain high contrast over a wide operating-temperature range. In other implementations, however, the illumination assembly 500 can be operable to generate a patterned illumination with high-contrast featured at different distances (e.g., from 100 mm to 1000 mm) Further, the illumination assembly 500 can be operable to generate a patterned illumination with high contrast features over a large range of distances (e.g., from 100 mm to 1000 mm) The example illumination assembly 500 can be modeled or simulated by, for example, sequential and/or non-sequential ray-tracing simulation software such as Zemax. Starting from the object-side and progressing to the image side of the illumination assembly 500, the illumination assembly 500 includes first, second, and third optical elements 501, 502, 503 respectively. The first optical element and third optical elements 501, 503 can be composed of an optical polymer such as F52R (i.e., an optical polymer having the properties of ZEONEX F52R). However any suitable optical polymer can be substituted; for example, any optical polymer with a similarly low birefringence, with thermodynamic transition temperatures (e.g., melting temperatures, other transition temperatures) that are well above the intended operating temperature (e.g., above 80° C.), high optical transmission, with similar refractive indices, and optical polymers with similar thermal behavior with respect to refractive index and dimensional stability can be substituted. The second optical element 502 can be composed of an optical polymer such as OKP-1 (i.e., having the properties of OKP-1 optical polymer). However any suitable optical polymer can be substituted; for example, any optical polymer with a similarly low birefringence, with thermodynamic transition temperatures (e.g., melting temperatures, other transition temperatures) that are well above the intended operating temperature (e.g., above 80° C.), high optical transmission, with similar refractive indices, and optical polymers with similar thermal behavior with respect to refractive index and dimensional stability can be substituted. The illumination assembly 500 further includes an array of monochromatic light sources 504 located at the object position (of the simulation depicted in FIG. 5). The array of monochromatic light sources can be an array of monochromatic vertical-cavity surface-emitting lasers. In other implementations, however, an illuminated mask (the mask including portions defining throughholes that permit transmission of light) can be operable as the array of monochromatic light sources. Further, the array of monochromatic light sources can emit light of a particular wavelength, or narrow range of wavelengths such as infrared radiation. In the example illumination assembly depicted in FIG. 5, the array of monochromatic light sources is operable to emit light of a wavelength of 850 nm; however, in other implementations the array of monochromatic light sources can be operable to emit other wavelengths of light. Further, in the example illumination assembly depicted in FIG. 5 the array of monochromatic light sources are telecentric, e.g., laser beam source, with a normalized Gaussian profile and angular intensity distribution according to the following: I=exp(−2*angle/arcsine (N.A.)). In this example, N.A. (i.e., numerical aperture of the light source) is 0.19. However, in other example, the numerical aperture of the monochromatic light source can be larger or smaller depending on the intended application. For example, in some implementations the numerical aperture of the monochromatic light source can be as much as 0.3, while in other implementations the numerical aperture can be 0.1. Still in other implementations numerical apertures of the monochromatic light source can be between 0.1 and 0.3.

In this example, the illumination assembly 500 further includes a focal-length correction layer 505; however, the focal-length correction layer can be omitted in other implementations (where manufacturing, or other tolerances permit). The focal-length correction layer can be composed of an optical glass such as D263T (i.e., having the properties of Schott D 263 T). However any suitable optical glass can be substituted; for example, any optical glass with a similarly low birefringence, with thermodynamic transition temperatures (e.g., melting temperatures, other transition temperatures) that are well above the intended operating temperature (e.g., above 80° C.), high optical transmission, with similar refractive indices, and optical glasses with similar thermal behavior with respect to refractive index and dimensional stability can be substituted. Further the focal-length correction layer can include a layer or layers of removable material of suitable optical quality such as a radiation-sensitive photoresist. In some cases, portions of the radiation-sensitive photoresist can be removed to correct the focal-length of the illumination assembly 500, further details are discussed below.

The array of monochromatic light sources 504 are positioned on an illumination plane 506. Each monochromatic light source can be characterized by a numerical aperture 507. In some implementations, the numerical aperture can range from 0.1-0.3. Each monochromatic light source can be further characterized by a chief ray 508 (i.e., the principal ray emanating from each monochromatic light source). In the implementation depicted in FIG. 5, the chief rays 508 of each monochromatic light source are substantially orthogonal to the illumination plane 506. Further, the monochromatic light sources are distributed over a diameter 509 (the first diameter of the illumination assembly 500) of the illumination plane 506.

In this implementation, the first optical element 501 includes first and second aspheric optical surfaces 510, 512, respectively. The first aspheric optical surface 510 is positioned on the object side of the optical element 501, while the second aspheric optical surface 512 is positioned on the image-side of the optical element 501. The aspheric optical surface 510 is separated from the array of monochromatic light sources 504 by a first separation 511 relative to the vertex of the optical surface. The first and second aspheric optical surfaces 510, 512 are separated from each other by a first thickness 513 relative to the vertices of the respective optical surfaces (i.e. the thickness of the first optical element 501). Further, in this implementation, the first aspheric optical surface 510 is a convex object-side surface characterized by a diameter 514 (the second diameter in the illumination assembly 500). The second aspheric optical surface 512, in this implementation, is a convex image-side surface characterized by a diameter 515 (the third diameter in the illumination assembly 500).

The second optical element 502 includes two aspheric optical surfaces 516, 518, respectively (the third 516 and fourth 518 aspheric optical surfaces in the illumination assembly 500). The third aspheric optical surface 516 is separated from the second aspheric optical surface 512 by a separation 517 relative to the vertices of the respective optical surfaces (the second separation 517 in the illumination assembly 500). The fourth aspheric optical surface 518 is separated from the third aspheric optical surface by a thickness 519 relative to the vertices of the respective optical surfaces (the second thickness 519 in the illumination assembly 500). The third aspheric optical surface 516 is a convex object-side surface, in this implementation, characterized by a diameter 520 (the fourth diameter 520 in the illumination assembly 500. Further, the fourth aspheric optical surface 518 is a concave image-side surface characterized by a diameter 521 (the fifth diameter 521 in the illumination assembly 500).

The third optical element 503 includes two aspheric optical surfaces 522, 524, respectively (the fifth 522 and sixth 524 aspheric optical surfaces in the illumination assembly 500). The fifth aspheric optical surface 522 is separated from the fourth aspheric optical surface 518 by a separation 523 relative to the vertices of the respective optical surfaces (the third separation 523 in the illumination assembly 500). The sixth aspheric optical surface 524 is separated from the fifth aspheric optical surface 522 by a thickness 525 relative to the vertices of the respective optical surfaces (the third thickness 525 in the illumination assembly 500). The fifth aspheric optical surface 522 can be a convex object-side surface, in this implementation, characterized by a diameter 526 (the sixth diameter 526 in the illumination assembly 500). Further, the sixth aspheric optical surface 524 can be a concave image-side surface, in this implementation, characterized by a diameter 527 (the seventh diameter 527 in the illumination assembly 500).

The array of monochromatic light sources 504, the first optical element 501, the second optical element 502, and the third optical element 503 define an optical axis 528. The optical axis 528 is substantially parallel to the chief ray 508 of each light source in the array of monochromatic light sources 504 in this implementation. Further, the array of monochromatic light sources 504, the first optical element 501, the second optical element 502, and the third optical element 503 define an on-axis focal length 529 (representatively depicted as a dotted arrow in FIG. 5), an aspect ratio can have a value of at least 0.81 (i.e., the largest diameter from among diameters of the optical element surfaces of the illumination assembly 500/total track length, where the total track length is defined as the sum of the first separation, first thickness, second separation, second thickness, third separation, and third thickness), and an exit aperture 530. Further, the chief ray 508 of each light source in the array of monochromatic light sources 504 substantially converges at the exit aperture 530 obviating the need for a physical aperture stop. Accordingly, as substantially all of the light emitted by the array of monochromatic light sources converges at the exit aperture 530 the illumination assembly is particularly efficient. The exit aperture 530 is further characterized by a diameter 531 (an eighth diameter 531 in the illumination assembly 500) and is separated from the planar optical surface 524 by a separation 532 relative to the vertex of the optical surface (the fourth separation 532 in the illumination assembly 500).

The focal-length correction layer 505, described above, can include a first focal-length correction layer surface 533 separated from the array of monochromatic light sources by a separation 534 (the fifth separation 534 in the illumination assembly 500). The focal-length correction layer 505 can have a second focal-length correction surface 535 juxtaposed from the first focal-length correction layer surface 533 by a thickness 536 (the fourth thickness 536 in the illumination assembly 500). The first focal-length correction layer surface 533 is a planar object-side surface and the second focal-length correction layer surface 535 is a planar image-side surface in this implementation. Further, both surfaces 533, 535 can be substantially parallel and substantially orthogonal to the optical axis 528. The surfaces 533, 535 are further characterized by a single diameter 537 (the ninth diameter in the illumination assembly 500) in this implementation. As described above, the surfaces 533, 535 can further include a photo-sensitive photo-resist material.

In the example illumination assembly depicted in FIG. 5, the optical elements 501, 502 and 503 are implemented as aspheric optical elements. That is, the first, second, third, fourth, fifth and sixth aspheric optical surfaces 510, 512, 516, 518, 522, and 524, respectively are implemented as aspheric surfaces that can be described by the following set of polynomial coefficients and constants as implemented in the typical aspheric surface equation described above.

The first, second, third, fourth, fifth and sixth and fourth aspheric optical surfaces 510, 512, 516, 518, 522, and 524, respectively, are further described by the radiuses of curvature −4.465896, −0.9442873, 0.4215515, 0.2268197, 0.5612735, and −1.920142, respectively, the conic constants (K) 19, −1.068452, −1.64571, −2.32752, −0.6441353, and 0, respectively.

| Coefficient | Surface | | | | | |
|---|---|---|---|---|---|---|
| | $1^{st}$ Aspheric | $2^{nd}$ Aspheric | $3^{rd}$ Aspheric | $4^{th}$ Aspheric | $5^{th}$ Aspheric | $6^{th}$ Aspheric |
| Fourth-order | 0.66760571 | 0.27326219 | 1.1956958 | 12.14337 | 0.800012 | 1.140136 |
| Sixth-order | −0.9466132 | −0.32354512 | 0.61911333 | −64.1117 | 7.89132 | −8.3061 |
| Eighth-order | 0.48693237 | 0.13469408 | −13.136109 | 104.8944 | −50.147 | 66.42594 |
| Tenth-order | 0 | 0 | 14.439032 | −45.7416 | 61.74819 | 0 |

In the example implementation depicted in FIG. 5, the on-axis focal length 529 can be 1.00 mm, for example, relative to the illumination plane. Accordingly, the first separation 511 can be 0.45 mm, the second separation 517 can be 0.05 mm, the third separation 523 can be 0.2011 mm, the fourth separation 532 can be 0.01 mm, the fifth separation 534 can be 0.18 mm, the first thickness 513 can be 0.69 mm, the second thickness 519 can be 0.46 mm, the third thickness 525 can be 0.56 mm, the fourth thickness 536 can be 0.21 mm, the first diameter 509 can be 1.8 mm, the second diameter 514 can be 1.92 mm, the third diameter 515 can be 1.96 mm, the fourth diameter 520 can be 1.4 mm, the fifth diameter 521 can be 1.0 mm, the sixth diameter 526 can be 1.0 mm, the seventh diameter 527 can be 0.72 mm, the eighth diameter 531 can be 0.6 mm, the ninth diameter 537 can be 2.4 mm.

However, different on-axis focal lengths can be used in other implementations of the example illumination assembly 500 depicted in FIG. 5. Accordingly, the separations, thicknesses, and diameters of the implementation depicted in FIG. 5 can also be described as ratios of the on-axis focal length. Consequently, the ratio of the first diameter 509 to the on-axis focal length 529 can be 1.8, the ratio of the second diameter 514 to the on-axis focal length 529 can be 1.92, the ratio of the third diameter 515 to the on-axis focal length 529 can be 1.96, the ratio of the fourth diameter 520 to the on-axis focal length 529 can be 1.4, the ratio of the fifth diameter 521 to the on-axis focal length 529 can be 1.0, the ratio of the sixth diameter 526 to the on-axis focal length 529 can be 1.0, the ratio of the seventh diameter 527 to the on-axis focal length 529 can be 0.72, the ratio of the eighth diameter 531 to the on-axis focal length 529 can be 0.6, the ratio of the ninth diameter 537 to the on-axis focal length 529 can be 2.4, the ratio of the first separation 511 to the on-axis focal length 529 can be 0.45, the ratio of the second separation 517 to the on-axis focal length 529 can be 0.05, the ratio of the third separation 523 to the on-axis focal length 529 can be 0.201, the ratio of the fourth separation 532 to the on-axis focal length 529 can be 0.01, the ratio of the fifth separation 534 to the on-axis focal length 529 can be 0.18, the ratio of the first thickness 513 to the on-axis focal length 529 can be 0.69, the ratio of the second thickness 519 to the on-axis focal length 529 can be 0.46, the ratio of the third thickness 525 to the on-axis focal length 529 can be 0.56, and the ratio of the fourth thickness 536 to the on-axis focal length 529 can be 0.21. Since the example illumination assembly 500 described above can be modeled or simulated by, for example, sequential and/or non-sequential ray-tracing simulation software such as Zemax, the numerals included above describe the various components (e.g., thicknesses, diameters, surface shapes) and their position within the illumination assembly 500, these numerals include a plurality of decimal places. For example the aspheric coefficients used to describe the aspheric surfaces of various components above can include as many as eight decimals places. However, although up to eight decimals places are included above, in some cases far fewer decimal places are needed to adequately describe the various components and their respective position within the illumination assembly 500. For example, in some cases no more than two decimal places are required in order to effectively describe various components and their respective position described above.

Figure 6:
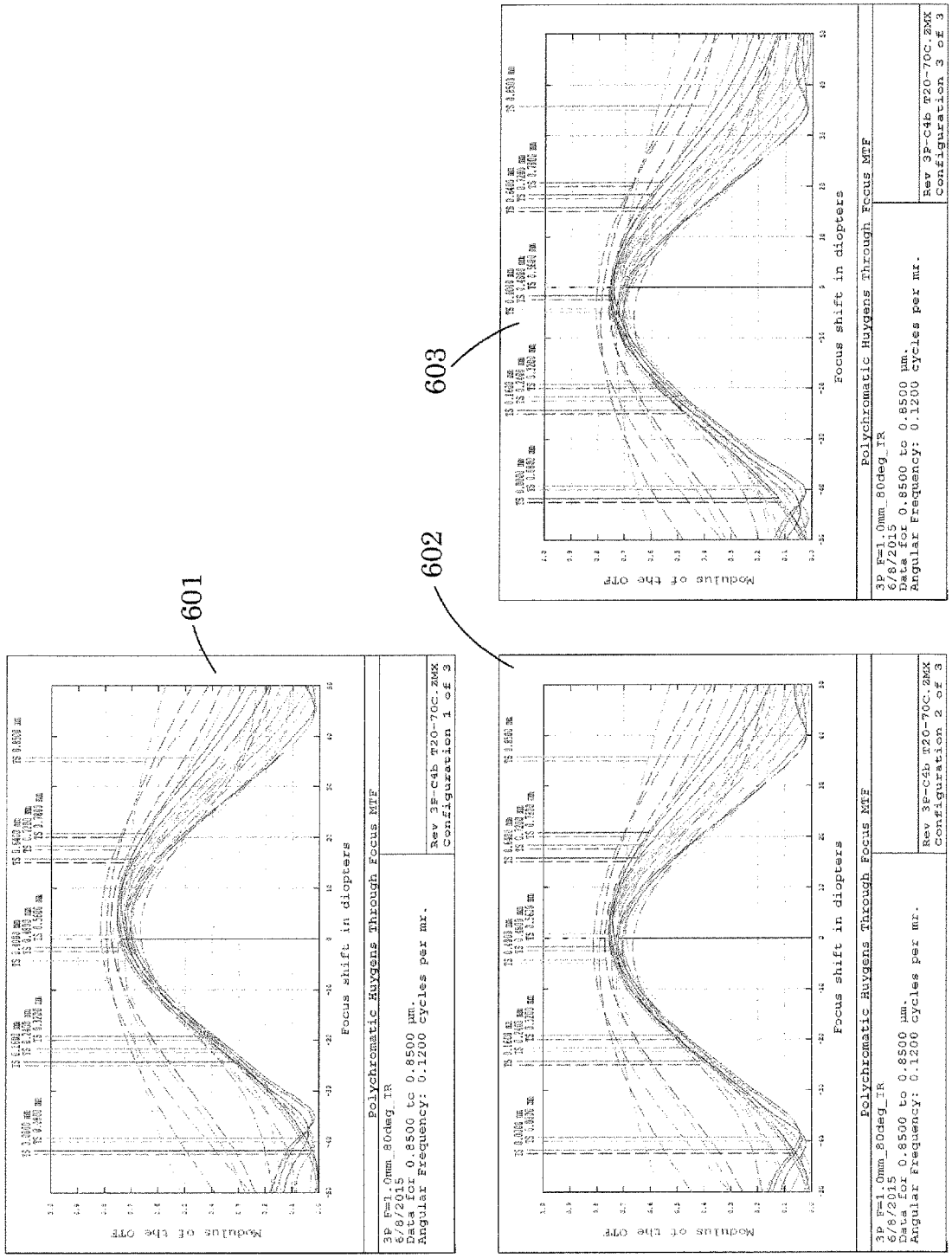
FIG. 6 depicts MTF curves of the example implementation depicted in FIG. 5.

FIG. 6 depicts mean transfer function data (MTF curves) of the example implementation depicted in FIG. 5. The MTF curves illustrate the high contrast of the patterned illumination generated by the illumination assembly 500 over a wide operating-temperature range; specifically, 20° C. 601, 45° C. 602, and 70° C. 603.

Figure 7:
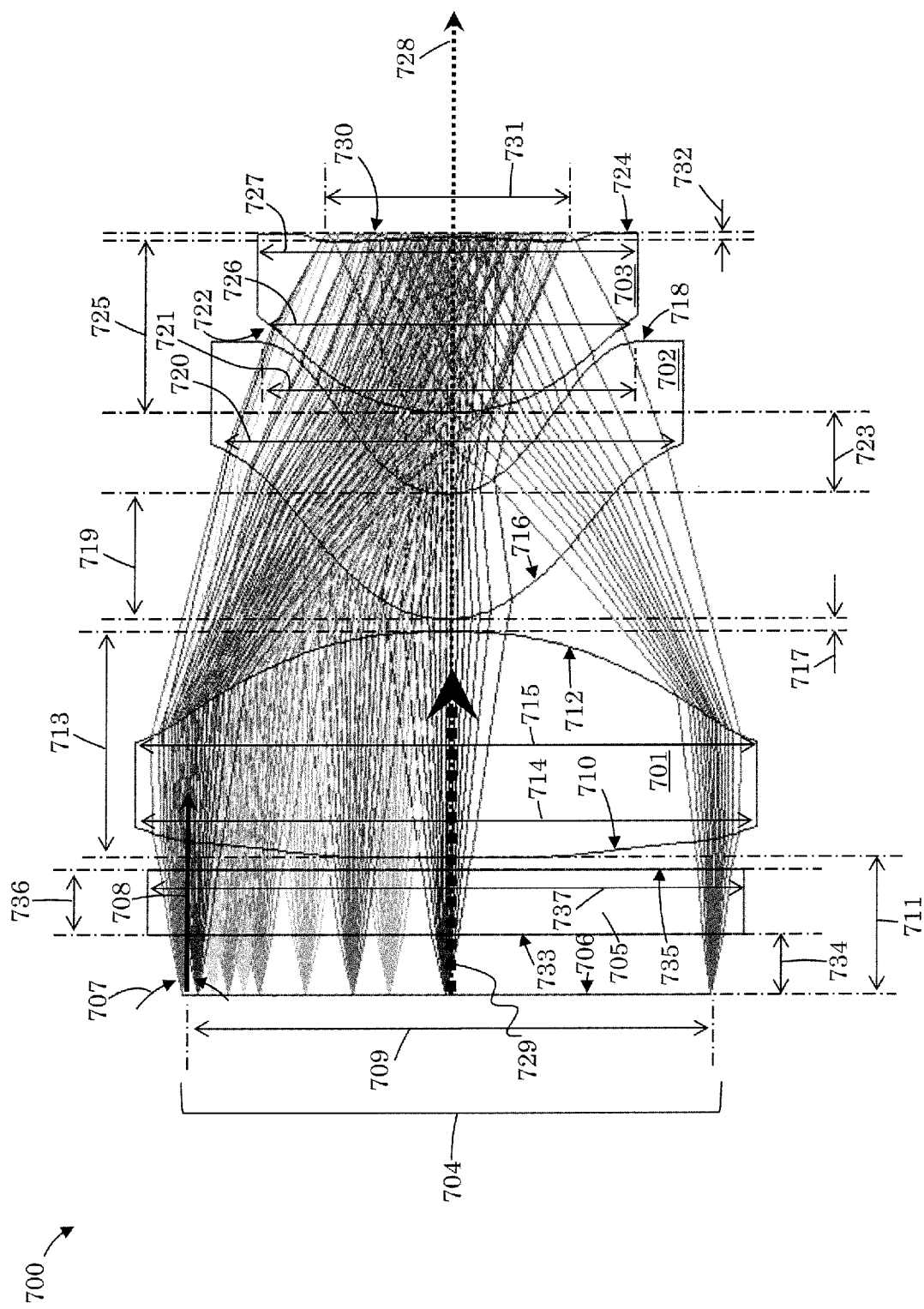
FIG. 7 depicts another example illumination assembly implemented with three optical elements, a focal-length correction layer, and an illumination source

FIG. 7 depicts an example illumination assembly 700 operable to generate a patterned illumination with high-contrast features at 1000 mm with a diameter of 1745.742 mm that can maintain high contrast over a wide operating-temperature range. In other implementations, however, the illumination assembly 700 can be operable to generate a patterned illumination with high-contrast featured at different distances (e.g., from 100 mm to 1000 mm) Further, the illumination assembly 700 can be operable to generate a patterned illumination with high contrast features over a large range of distances (e.g., from 100 mm to 1000 mm) The example illumination assembly 700 can be modeled or simulated by, for example, sequential and/or non-sequential ray-tracing simulation software such as Zemax. Starting from the object-side and progressing to the image side of the illumination assembly 700, the illumination assembly 700 includes first, second, and third optical elements 701, 702, 703 respectively. The first optical element and third optical elements 701, 703 can be composed of an optical polymer such as F52R (i.e., an optical polymer having the properties of ZEONEX F52R). However any suitable optical polymer can be substituted; for example, any optical polymer with a similarly low birefringence, with thermodynamic transition temperatures (e.g., melting temperatures, other transition temperatures) that are well above the intended operating temperature (e.g., above 80° C.), high optical transmission, with similar refractive indices, and optical polymers with similar thermal behavior with respect to refractive index and dimensional stability can be substituted. The second optical element 702 can be composed of an optical polymer such as OKP-1 (i.e., having the properties of OKP-1 optical polymer). However any suitable optical polymer can be substituted; for example, any optical polymer with a similarly low birefringence, with thermodynamic transition temperatures (e.g., melting temperatures, other transition temperatures) that are well above the intended operating temperature (e.g., above 80° C.), high optical transmission, with similar refractive indices, and optical polymers with similar thermal behavior with respect to refractive index and dimensional stability can be substituted. The illumination assembly 700 further includes an array of monochromatic light sources 704 located at the object position (of the simulation depicted in FIG. 7). The array of monochromatic light sources can be an array of monochromatic vertical-cavity surface-emitting lasers. In other implementations, however, an illuminated mask (the mask including portions defining throughholes that permit transmission of light) can be operable as the array of monochromatic light sources. Further, the array of monochromatic light sources can emit light of a particular wavelength, or narrow range of wavelengths such as infrared radiation. In the example illumination assembly depicted in FIG. 7, the array of monochromatic light sources is operable to emit light of a wavelength of 850 nm; however, in other implementations the array of monochromatic light sources can be operable to emit other wavelengths of light. Further, in the example illumination assembly depicted in FIG. 7 the array of monochromatic light sources are telecentric, e.g., laser beam source, with a normalized Gaussian profile and uniform intensity distribution according to the following: I=exp(−2*angle/arcsine (N.A.)). In this example, N.A. (i.e., numerical aperture of the light source) is 0.22. However, in other example, the numerical aperture of the monochromatic light source can be larger or smaller depending on the intended application. For example, in some implementations the numerical aperture of the monochromatic light source can be as much as 0.3, while in other implementations the numerical aperture can be 0.1. Still in other implementations numerical apertures of the monochromatic light source can be between 0.1 and 0.3.

In this example, the illumination assembly 700 further includes a focal-length correction layer 705; however, the focal-length correction layer can be omitted in other implementations (where manufacturing, or other tolerances permit). The focal-length correction layer can be composed of an optical glass such as D263T (i.e., having the properties of Schott D 263 T). However any suitable optical glass can be substituted; for example, any optical glass with a similarly low birefringence, with thermodynamic transition temperatures (e.g., melting temperatures, other transition temperatures) that are well above the intended operating temperature (e.g., above 80° C.), high optical transmission, with similar refractive indices, and optical glasses with similar thermal behavior with respect to refractive index and dimensional stability can be substituted. Further the focal-length correction layer can include a layer or layers of removable material of suitable optical quality such as a radiation-sensitive photoresist. In some cases, portions of the radiation-sensitive photoresist can be removed to correct the focal-length of the illumination assembly 700, further details are discussed below.

The array of monochromatic light sources 704 are positioned on an illumination plane 706. Each monochromatic light source can be characterized by a numerical aperture 707. In some implementations, the numerical aperture can range from 0.1-0.3. Each monochromatic light source can be further characterized by a chief ray 708 (i.e., the principal ray emanating from each monochromatic light source). In the implementation depicted in FIG. 7, the chief rays 708 of each monochromatic light source are substantially orthogonal to the illumination plane 706. Further, the monochromatic light sources are distributed over a diameter 709 (the first diameter of the illumination assembly 700) of the illumination plane 706.

In this implementation, the first optical element 701 includes first and second aspheric optical surfaces 710, 712, respectively. The first aspheric optical surface 710 is positioned on the object side of the optical element 701, while the second aspheric optical surface 712 is positioned on the image-side of the optical element 701. The aspheric optical surface 710 is separated from the array of monochromatic light sources 704 by a first separation 711 relative to the vertex of the optical surface. The first and second aspheric optical surfaces 710, 712 are separated from each other by a first thickness 713 relative to the vertices of the respective optical surfaces (i.e., the thickness of the first optical element 701. Further, in this implementation, the first aspheric optical surface 710 is a convex object-side surface characterized by a diameter 714 (the second diameter in the illumination assembly 700). The second aspheric optical surface 712, in this implementation, is a convex image-side surface characterized by a diameter 715 (the third diameter in the illumination assembly 700).

The second optical element 702 includes two aspheric optical surfaces 716, 718, respectively (the third 716 and fourth 718 aspheric optical surfaces in the illumination assembly 700). The third aspheric optical surface 716 is separated from the second aspheric optical surface 712 by a separation 717 relative to the vertices of the respective optical surfaces (the second separation 717 in the illumination assembly 700). The fourth aspheric optical surface 718 is separated from the third aspheric optical surface by a thickness 719 relative to the vertices of the respective optical surfaces (the second thickness 719 in the illumination assembly 700). The third aspheric optical surface 716 is a convex object-side surface, in this implementation, characterized by a diameter 720 (the fourth diameter 720 in the illumination assembly 700). Further, the fourth aspheric optical surface 718 is a concave image-side surface characterized by a diameter 721 (the fifth diameter 721 in the illumination assembly 700).

The third optical element 703 includes two aspheric optical surfaces 722, 724, respectively (the fifth 722 and sixth 724 aspheric optical surfaces in the illumination assembly 700). The fifth aspheric optical surface 722 is separated from the fourth aspheric optical surface 718 by a separation 723 relative to the vertices of the respective optical surfaces (the third separation 723 in the illumination assembly 700). The sixth aspheric optical surface 724 is separated from the fifth aspheric optical surface 722 by a thickness 725 relative to the vertices of the respective optical surfaces (the third thickness 725 in the illumination assembly 700). The fifth aspheric optical surface 722 can be a convex object-side surface, in this implementation, characterized by a diameter 726 (the sixth diameter 726 in the illumination assembly 700). Further, the sixth aspheric optical surface 724 can be a concave image-side surface, in this implementation, characterized by a diameter 727 (the seventh diameter 727 in the illumination assembly 700).

The array of monochromatic light sources 704, the first optical element 701, the second optical element 702, and the third optical element 703 define an optical axis 728. The optical axis 728 is substantially parallel to the chief ray 708 of each light source in the array of monochromatic light sources 704 in this implementation. Further, the array of monochromatic light sources 704, the first optical element 701, the second optical element 702, and the third optical element 703 define an on-axis focal length 729 (representatively depicted as a dotted arrow in FIG. 7), an aspect ratio can have a value of at least 0.8186 (i.e., the largest diameter from among diameters of the optical element surfaces of the illumination assembly 700/total track length, where the total track length is defined as the sum of the first separation, first thickness, second separation, second thickness, third separation, and third thickness), and an exit aperture 730. Further, the chief ray 708 of each light source in the array of monochromatic light sources 704 substantially converges at the exit aperture 730 obviating the need for a physical aperture stop. Accordingly, as substantially all of the light emitted by the array of monochromatic light sources converges at the exit aperture 730 the illumination assembly is particularly efficient. The exit aperture 730 is further characterized by a diameter 731 (an eighth diameter 731 in the illumination assembly 700) and is separated from the planar optical surface 724 by a separation 732 relative to the vertex of the optical surface (the fourth separation 732 in the illumination assembly 700).

The focal-length correction layer 705, described above, can include a first focal-length correction layer surface 733 separated from the array of monochromatic light sources by a separation 734 (the fifth separation 734 in the illumination assembly 700). The focal-length correction layer 705 can have a second focal-length correction surface 735 juxtaposed from the first focal-length correction layer surface 733 by a thickness 736 (the fourth thickness 736 in the illumination assembly 700). The first focal-length correction layer surface 733 is a planar object-side surface and the second focal-length correction layer surface 735 is a planar image-side surface in this implementation. Further, both surfaces 733, 735 can be substantially parallel and substantially orthogonal to the optical axis 728. The surfaces 733, 735 are further characterized by a single diameter 737 (the ninth diameter in the illumination assembly 700) in this implementation. As described above, the surfaces 733, 735 can further include a photo-sensitive photo-resist material.

In the example illumination assembly depicted in FIG. 7, the optical elements 701, 702 and 703 are implemented as aspheric optical elements. That is, the first, second, third, fourth, fifth and sixth aspheric optical surfaces 710, 712, 716, 718, 722, and 724, respectively are implemented as aspheric surfaces that can be described by the following set of polynomial coefficients and constants as implemented in the typical aspheric surface equation described above.

The first, second, third and fourth aspheric optical surfaces 710, 712, 716, 718, 722, and 724, respectively, are further described by the radiuses of curvature −9.007072, −2.18133, 0.3417996, 0.2517329, 0.7257131, and −2.212305, respectively, the conic constants (K) 0, 0, −0.9530726, −1.031242, 0.3104532, and 8.122147, respectively.

| Coefficient-order | Surface | | | | | |
|---|---|---|---|---|---|---|
| | 1st Aspheric | 2nd Aspheric | 3rd Aspheric | 4th Aspheric | 5th Aspheric | 6th Aspheric |
| Fourth | 0.93303568 | −0.79176297 | 0.1673353 | 6.7137531 | 0.65266102 | 0.96952787 |
| Sixth | −2.0983824 | 1.9908004 | 3.3187018 | −55.134041 | −3.7898898 | −8.0980725 |
| Eighth | 1.6873942 | −2.8464207 | −31.881717 | 173.05054 | 61.389694 | 79.398756 |
| Tenth | −0.13645446 | 2.0963468 | 56.662895 | −427.37834 | −412.23502 | −208.42939 |
| Twelfth | −0.23055291 | −0.56397968 | −26.507533 | 750.98834 | 1022.2847 | 270.19808 |
| Fourteenth | 0 | 0 | −6.5216693 | −573.86982 | −946.61871 | 0 |

In the example implementation depicted in FIG. 7, the on-axis focal length 729 can be 1.0082 mm, for example, relative to the illumination plane. Accordingly, the first separation 711 can be 0.44 mm, the second separation 717 can be 0.04 mm, the third separation 723 can be 0.2617 mm, the fourth separation 732 can be 0.011 mm, the fifth separation 734 can be 0.19 mm, the first thickness 713 can be 0.729 mm, the second thickness 719 can be 0.405 mm, the third thickness 725 can be 0.5673 mm, the fourth thickness 736 can be 0.21 mm, the first diameter 709 can be 1.7 mm, the second diameter 714 can be 2 mm, the third diameter 715 can be 2 mm, the fourth diameter 720 can be 1.52 mm, the fifth diameter 721 can be 1.29 mm, the sixth diameter 726 can be 1.23 mm, the seventh diameter 727 can be 0.93 mm, the eighth diameter 731 can be 0.8600 mm, the ninth diameter 737 can be 1.9198 mm.

However, different on-axis focal lengths can be used in other implementations of the example illumination assembly 700 depicted in FIG. 7. Accordingly, the separations, thicknesses, and diameters of the implementation depicted in FIG. 7 can also be described as ratios of the on-axis focal length. Consequently, the ratio of the first diameter 709 to the on-axis focal length 729 can be 1.6862, the ratio of the second diameter 714 to the on-axis focal length 729 can be 1.9838, the ratio of the third diameter 715 to the on-axis focal length 729 can be 1.9838, the ratio of the fourth diameter 720 to the on-axis focal length 729 can be 1.5077, the ratio of the fifth diameter 721 to the on-axis focal length 729 can be 1.2796, the ratio of the sixth diameter 726 to the on-axis focal length 729 can be 1.22, the ratio of the seventh diameter 727 to the on-axis focal length 729 can be 0.9225, the ratio of the eighth diameter 731 to the on-axis focal length 729 can be 0.8530, the ratio of the ninth diameter 737 to the on-axis focal length 729 can be 1.9042, the ratio of the first separation 711 to the on-axis focal length 729 can be 0.4364, the ratio of the second separation 717 to the on-axis focal length 729 can be 0.0397, the ratio of the third separation 723 to the on-axis focal length 729 can be 0.2596, the ratio of the fourth separation 732 to the on-axis focal length 729 can be 0.0109, the ratio of the fifth separation 734 to the on-axis focal length 729 can be 0.1885, the ratio of the first thickness 713 to the on-axis focal length 729 can be 0.7231, the ratio of the second thickness 719 to the on-axis focal length 729 can be 0.4017, the ratio of the third thickness 725 to the on-axis focal length 729 can be 0.5627, and the ratio of the fourth thickness 736 to the on-axis focal length 729 can be 0.2083. Since the example illumination assembly 700 described above can be modeled or simulated by, for example, sequential and/or non-sequential ray-tracing simulation software such as Zemax, the numerals included above describe the various components (e.g., thicknesses, diameters, surface shapes) and their position within the illumination assembly 700, these numerals include a plurality of decimal places. For example the aspheric coefficients used to describe the aspheric surfaces of various components above can include as many as eight decimals places. However, although up to eight decimals places are included above, in some cases far fewer decimal places are needed to adequately describe the various components and their respective position within the illumination assembly 700. For example, in some cases no more than two decimal places are required in order to effectively describe various components and their respective position described above.

Figure 8:
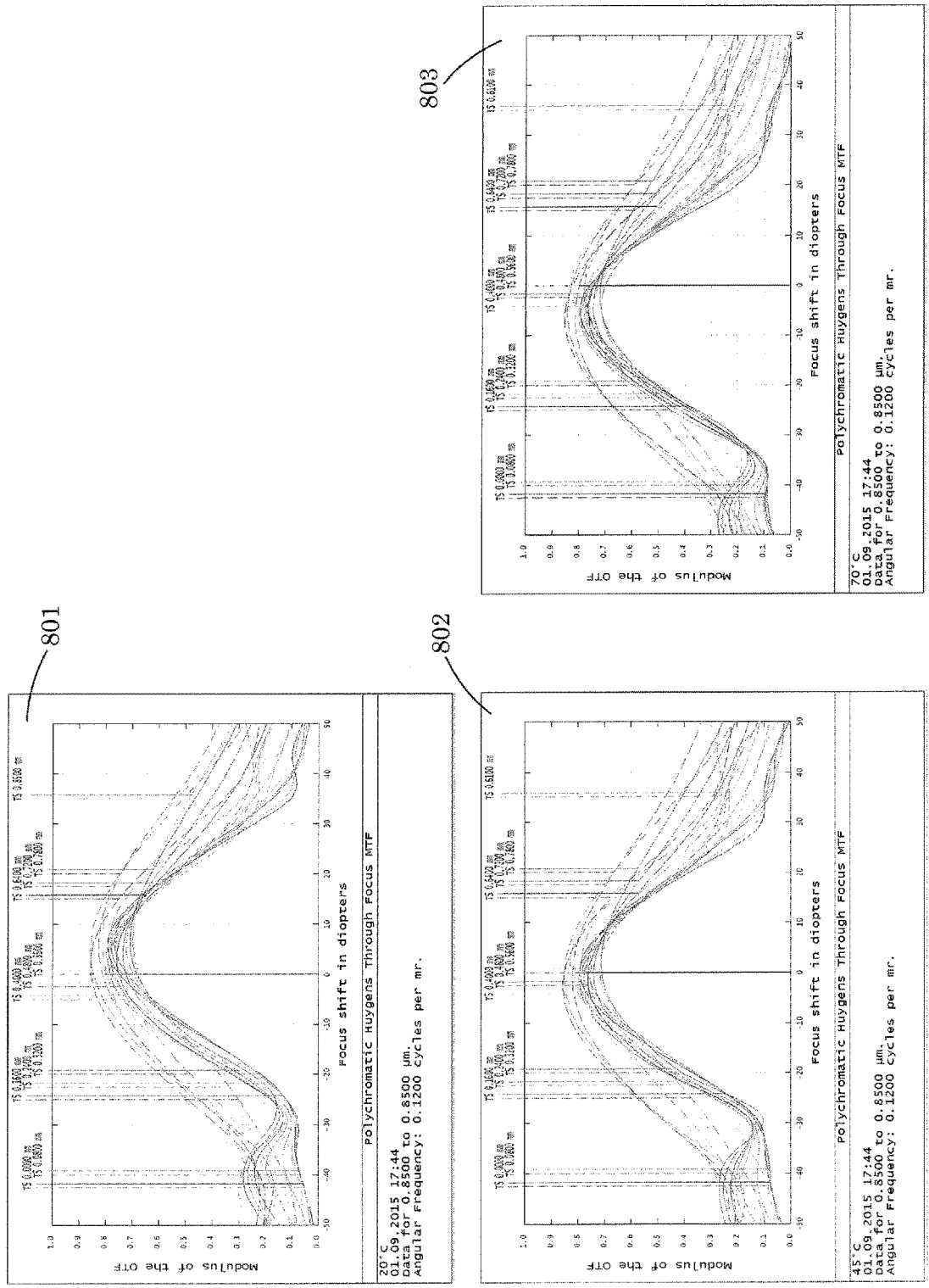
FIG. 8 depicts MTF curves of the example implementation depicted in FIG. 7.

FIG. 8 depicts mean transfer function data (MTF curves) of the example implementation depicted in FIG. 7. The MTF curves illustrate the high contrast of the patterned illumination generated by the illumination assembly 700 over a wide operating-temperature range; specifically, 20° C. 801, 45° C. 802, and 70° C. 803.

Figure 9B:
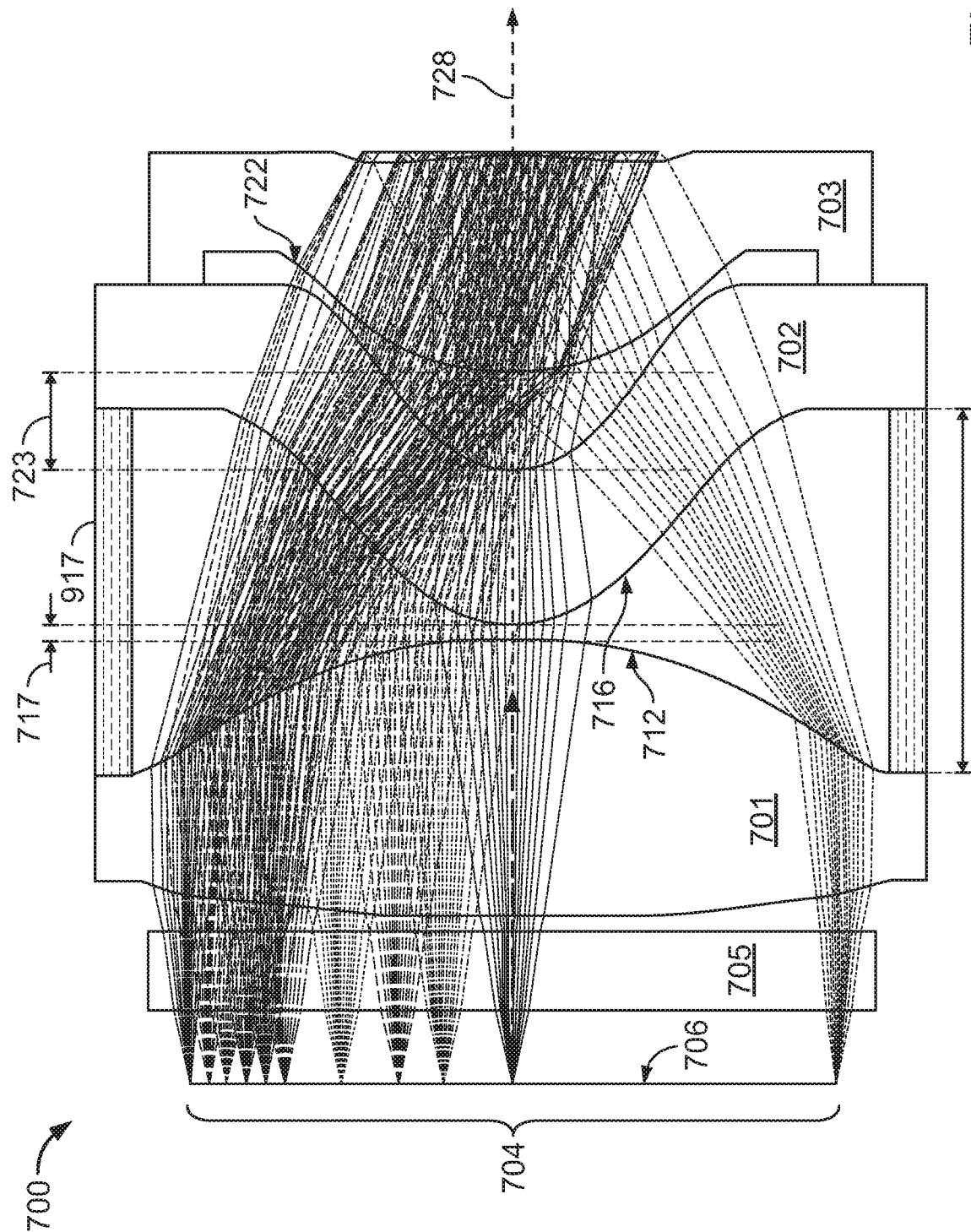
FIG. 9B depicts an example illumination assembly as depicted in FIG. 7 with the addition of a thermal compensation spacer.

Some optical elements can include lens-stacking features at their respective peripheral edges, these features can permit the optical elements to be stacked to each other (i.e., direct lens stacking). Generally, direct lens stacking describes a process where optical elements are stacked directly (e.g., via lens-stacking features contiguous with respective optical elements) to each other or when they are stacked with an immediate layer of adhesive. FIG. 9A and FIG. 9B depict optical element stacking stacked via direct lens stacking. FIG. 9A depicts the example illumination assembly 100 depicted in FIG. 1. The second optical element 102 includes lens-stacking features 902 at its peripheral edge 903. The lens stacking features 902 can be in direct contact with the first optical element 101 or an intermediate layer of adhesive can be present, as discussed above. Generally, lens-stacking features, that permit direct stacking, are possible when the surface curvatures of the optical elements and their corresponding separation are relatively small. For example, the second separation 116 in the illumination assembly 100 (the separation between the second and third aspheric optical surfaces, 111, 115, respectively) and the curvatures of the second and third aspheric optical surface 111, 115, respectively permit direct stacking (via the lens-stacking features 902). However, the large curvature of the first aspheric optical surface 109 results in a large separation 904 at its peripheral edge 905 that does not permit direct stacking of the first optical element 101 to the focal correction layer 104. Direct stacking is not possible; for example, because it can be difficult to manufacture optical elements with lens-stacking features with sufficient length to span the large separation 904. Further, in other examples, as optical elements are often manufactured via a replication or molding process such as injection molding, the lens-stacking features are necessarily composed of the same material as the optical element itself. Often optical elements are composed of materials with relatively high (or unacceptably high) thermal expansion coefficients. Further the refractive index of optical elements (i.e., the refractive index of the materials of which they are composed) also changes with temperature. Accordingly, in some instances, if lens-stacking features could be manufactured to span the separation 904, then the thermal expansion of the material (e.g., over a temperature range of 20° C.-70° C.) would be too large to permit the illumination assembly 100 to maintain high-contrast and generally good quality (as depicted in FIG. 2). Further, in other instances, although a separate intermediate material may be implemented, the optical elements may exhibit a change in refractive index with temperature change. Consequently, a separate intermediate material that can span the large separation 904 and can compensate the change in refractive index of the optical elements with temperature change can be implemented. That is, in some implementations, the illumination assembly 100 can further include at least one thermal compensation spacer 906 composed, at least in part, of suitable material. The thermal compensation spacer can be implemented such that the patterned illumination maintains a high contrast over a wide temperature range (e.g., 20° C.-70° C.).

Generally, any material with suitable thermal expansion properties (i.e., coefficient of thermal expansion) can be used to manufacture the thermal compensation spacer 906, such as a fiber-filled polymer with a coefficient to thermal expansion of about 19 ppm/K, though other materials with different coefficients of thermal expansion can be used. For example, materials with coefficients of thermal expansion up to about 69 ppm/K can be used in some instances. Still in other implementations materials with coefficients of thermal expansion below 19 ppm/K can be used.

Further, as described above, a thermal compensation spacer (e.g., 906, 917) or a plurality of thermal compensation spacers can be included in some implementations, for example, the illumination assembly 100 as depicted in FIG. 1, the illumination assembly 300 as depicted in FIG. 3, the illumination assembly 500 as depicted in FIG. 5, and/or the illumination assembly 700 as depicted in FIG. 7. Further, the thermal compensation spacer or the plurality of thermal compensation spacers can be included in implementations that include a focal-length correction layer and others that do not include a focal-length correction layer. For example, in the implementation depicted in FIG. 1 the thermal compensation spacer can be included between the first optical element and the focal-length correction layer. However, in other instances, the implementation depicted in FIG. 1 may not include a focal-length correction layer; accordingly, the thermal compensation spacer can be between the first optical element and the illumination plane 105.

As mentioned above, a thermal compensation spacer can be included in some implementations when the curvature and/or the separation between various optical surfaces, or between an optical surface and other components, is too large. For example, in the illumination assembly 100 depicted in FIG. 1 and FIG. 9A, a thermal compensation spacer can be included when:

a) the first aspheric optical surface 109 has a focal-length-normalized curvature (i.e., curvature divided by the on-axis focal length) of between 0.1 and 0.7, e.g., 0.455;

b) the first aspheric optical surface has a maximum surface slope of between 10° and 40° within 40% to 80% the clear aperture; and c) the focal-length-normalized separation (i.e., separation divided by the on-axis focal length) between the focal-length correction layer and the first aspheric optical surface 109 (the first separation 110 minus the sum of the fourth separation 127 and the third thickness 129) is between 0.01 and 0.1, e.g., 0.067

In other example, the illumination assembly 100 not including the focal-length correction layer can include a thermal compensation spacer:

a) the first aspheric optical surface 109 has a focal-length-normalized curvature (i.e., curvature divided by the on-axis focal length) of between 0.1 and 0.7, e.g., 0.455;

b) the first aspheric optical surface has a maximum surface slope of between 10° and 40° within 40% to 80% the clear aperture; and c) the focal-length-normalized separation (i.e., separation divided by the on-axis focal length) between the illumination plane 105 and the first aspheric optical surface 109 (the first separation 110) is between 0.01 and 0.1, e.g., 0.565.

In another example, in the illumination assembly 300 depicted in FIG. 3, a thermal compensation spacer can be included when:

a) the second aspheric optical surface 312 has a focal-length normalized curvature of between 0.1 and 0.7, .e.g., 0.496;

b) the second aspheric optical surface 312 has a maximum surface slope of between 10° and 40° within 40% to 80% the clear aperture; and c) the third aspheric optical surface 316 has a focal-length-normalized curvature of between 1.5 and 2.5, e.g., 1.853;

d) the third aspheric optical surface 316 has a maximum surface slope of between 10° and 40° within 40% to 80% the clear aperture; and e) the focal-length normalized second separation 317 is between 0.01 and 0.15, e.g., 0.09.

In yet another example, in the illumination assembly 500 depicted in FIG. 5, a thermal compensation spacer can be included when:

a) the second aspheric optical surface 512 has a focal-length normalized curvature of between 0.5 and 1.5, e.g., 0.944;

b) the second aspheric optical surface 512 has a maximum surface slope of between 10° and 40° within 40% to 80% the clear aperture; and c) the third aspheric optical surface 516 has a focal-length-normalized curvature of between 0.1 and 0.9, e.g., 0.422;

d) the third aspheric optical surface 516 has a maximum surface slope of between 10° and 40° within 40% to 80% the clear aperture; and e) the focal-length normalized second separation 517 is between 0.01 and 0.1; e.g., 0.05.

In still yet, another example, in the illumination assembly 700 depicted in FIG. 7 and FIG. 9B, a thermal compensation spacer can be included when:

a) the second aspheric optical surface 712 has a focal-length normalized curvature of between 1 and 5, e.g., 2.164;

b) the second aspheric optical surface 712 has a maximum surface slope of between 10° and 40° within 40% to 80% the clear aperture; and c) the third aspheric optical surface 716 has a focal-length-normalized curvature of between 0.1 and 0.5, e.g., 0.339;

d) the third aspheric optical surface 716 has a maximum surface slope of between 10° and 40° within 40% to 80% the clear aperture; and e) the focal-length normalized second separation 717 is between 0.02 and 0.2, e.g., 0.0397.

Various modifications can be made, and the various detailed implementations described above are intended simply as examples. Combinations of the various features described above are within the scope of this disclosure. Accordingly, other implementations are within the scope of the claims.

What is claimed is:

1. An illumination assembly operable to generate a patterned illumination that maintains high contrast over a wide temperature range, the illumination assembly comprising:
an array of monochromatic light sources positioned on an illumination plane, wherein each monochromatic light source is characterized by a numerical aperture and a chief ray and the illumination plane is characterized by a first diameter;
a first optical element having a first aspheric optical surface separated from the array of monochromatic light sources by a first separation and the first optical element having a second aspheric optical surface juxtaposed from the first aspheric optical surface by a first thickness, wherein the first optical element comprises an optical polymer, and wherein the first aspheric optical surface is a convex object-side surface characterized by a second diameter and the second aspheric optical surface is a concave image-side surface characterized by a third diameter; and
a second optical element having a third aspheric optical surface separated from the second aspheric optical surface by a second separation and the second optical element having a fourth aspheric optical surface juxtaposed from the third aspheric optical surface by a second thickness, wherein the third aspheric optical surface is a convex object-side surface characterized by a fourth diameter and the fourth aspheric optical surface is a convex image-side surface characterized by a fifth diameter;

wherein the array of monochromatic light sources, first and second optical elements define an optical axis substantially parallel to the chief ray of each light source, an on-axis focal length, an aspect ratio defined as a largest of first, second, third, fourth and fifth diameters divided by a sum of first separation, first thickness, second separation and second thickness, the aspect ratio having a value of at least 0.77, and an exit aperture wherein the chief ray of each light source substantially converges, the exit aperture having a sixth diameter and being separated from the fourth aspheric optical surface by a third separation; and wherein the on-axis focal length is a focal length of light rays which propagate along the optical axis and which pass through the first and second optical elements.

2. The illumination assembly of claim 1, further comprising a focal-length correction layer, the focal-length correction layer having a first focal-length correction layer surface separated from the array of monochromatic light sources by a fourth separation and the focal-length correction layer having a second focal-length correction surface juxtaposed from the first focal-length correction layer surface by a third thickness, wherein the first focal-length correction layer surface is a planar object-side surface and the second focal-length correction layer surface is a planar image-side surface both surfaces being parallel, substantially orthogonal to the optical axis, and characterized by a seventh diameter.

3. The illumination assembly of claim 2, wherein the ratio of the first diameter to the on-axis focal length is 1.91:1, the ratio of the second diameter to the on-axis focal length is 2.13:1, the ratio of the third diameter to the on-axis focal length is 1.89:1, the ratio of the fourth diameter to the on-axis focal length is 1.80:1, the ratio of the ratio of the fifth diameter to the on-axis focal length is 1.44:1, the ratio of the sixth diameter to the on-axis focal length is 1.01:1, the ratio of the seventh diameter to the on-axis focal length is 2.16:1, the ratio of the first separation to the on-axis focal length is 0.57:1, the ratio of the second separation to the on-axis focal length is 0.21:1, the ratio of the third separation to the on-axis focal length is 0.39:1, the ratio of the fourth separation to the on-axis focal length is 0.26:1, the ratio of the first thickness to the on-axis focal length is 0.88:1, the ratio of the second thickness to the on-axis focal length is 0.73:1, the ratio of the third thickness to the on-axis focal length is 0.24:1.

4. The illumination assembly of claim 2, wherein the on-axis focal length is 0.89 mm, the first separation is 0.50 mm, the second separation is 0.19 mm, the third separation is 0.35 mm, the fourth separation is 0.23 mm, the first thickness is 0.79 mm, the second thickness is 0.65 mm, the third thickness is 0.21 mm, the first diameter is1.7 mm, the second diameter is 1.9 mm, the third diameter is 1.68 mm, the fourth diameter is 1.6 mm, the fifth diameter is 1.28 mm, the sixth diameter is 0.9 mm, the seventh diameter is 1.92 mm, the focal-length correction layer is comprised of D263T, the first optical element is comprised of OKP-1, the second optical element is comprised of M-BACD12.

5. The illumination assembly of claim 2, wherein the focal-length correction layer comprises an optical glass.

6. The illumination assembly of claim 2, wherein the focal-length correction layer comprises an optical glass and a photoresist material.

7. The illumination assembly of claim 1, wherein the ratio of the sixth diameter to the on-axis focal length is no greater than 1.01:1.

8. The illumination assembly of claim 1, wherein the ratio of the sixth diameter to the first diameter is no greater than 0.53:1.

9. The illumination assembly of claim 1, wherein the ratio of the sixth diameter to the smallest of second, third, fourth and fifth diameters is no greater than 0.70:1.

10. The illumination assembly of claim 1, wherein the ratio of the sixth diameter to the sum of the first separation, first thickness, second separation and second thickness is no greater than 0.36:1.

11. The illumination assembly of claim 1, wherein the ratio of the first diameter to the on-axis focal length is 1.91:1, the ratio of the second diameter to the on-axis focal length is 2.13:1, the ratio of the third diameter to the on-axis focal length is 1.89:1, the ratio of the fourth diameter to the on-axis focal length is 1.80:1, the ratio of the ratio of the fifth diameter to the on-axis focal length is 1.44:1, the ratio of the first separation to the on-axis focal length is 0.57:1, the ratio of the second separation to the on-axis focal length is 0.21:1, the ratio of the third separation to the on-axis focal length is 0.39:1, the ratio of the first thickness to the on-axis focal length is 0.88:1, the ratio of the second thickness to the on-axis focal length is 0.73:1.

12. The illumination assembly of claim 1, wherein each monochromatic light source of the array of monochromatic light sources comprises a vertical-cavity surface-emitting laser.

13. The illumination assembly of claim 1, wherein the array of monochromatic light sources comprises a backlit mask having portions of the mask defining an array of holes therethrough.

14. The illumination assembly of claim 1, wherein the on-axis focal length is 0.89 mm, the first separation is 0.50 mm, the second separation is 0.19 mm, the third separation is 0.35 mm, the first thickness is 0.79 mm, the second thickness is 0.65 mm, the first diameter is 1.7 mm, the second diameter is 1.9 mm, the third diameter is 1.68 mm, the fourth diameter is 1.6 mm, the fifth diameter is 1.28 mm, the sixth diameter is 0.9 mm, the first optical element is comprised of OKP-1, the second optical element is comprised of M-BACD12.

15. The illumination assembly of claim 14, wherein the first, second, third, and fourth aspheric surfaces can be described by the radiuses of curvature 0.41, 0.80, 0.97, -1.39, respectively, the conic constants (K) -0.85, -1, -4.39, and -12, respectively, and by the following polynomial coefficients:

| | Surface | | | |
|---|---|---|---|---|
| Coefficient | $1^{st}$ Aspheric | $2^{nd}$ Aspheric | $3^{rd}$ Aspheric | $4^{th}$ Aspheric |
| Fourth-order | −1.45 | 2.93 | −0.01 | −0.38 |
| Sixth-order | 5.00 | −18.60 | −4.50 | 1.44 |
| Eighth-order | −12.08 | 38.37 | 11.18 | −1.30 |
| Tenth-order | 11.41 | −34.81 | −7.27 | 0 |
| Twelfth-order | −4.12 | 11.67 | 0 | 0. |

16. The illumination assembly of claim 1, wherein each monochromatic light source of the array of monochromatic light sources emits light with a wavelength in the infrared spectrum.

17. The illumination assembly of claim 1, wherein the numerical aperture of each monochromatic light source of the array of monochromatic light sources is 0.1-0.3.

18. The illumination assembly of claim 1, wherein the second optical element comprises an optical glass.

* * * * *